(12) United States Patent
Rider et al.

(10) Patent No.: US 10,802,846 B2
(45) Date of Patent: Oct. 13, 2020

(54) METHOD OF WORKSPACE MODELING

(71) Applicant: VMware, Inc., Palo Alto, CA (US)

(72) Inventors: Eric Marshall Rider, Los Gatos, CA (US); Aditya Bhandari, Mountain View, CA (US); Deyan Angelov, Sofia (BG); Sibin Georgiev, Sofia (BG); Petar Nikalaev Ivanov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 921 days.

(21) Appl. No.: 14/941,190

(22) Filed: Nov. 13, 2015

(65) Prior Publication Data

US 2017/0139724 A1    May 18, 2017

(51) Int. Cl.
| | |
|---|---|
| *G06Q 10/06* | (2012.01) |
| *G06F 9/451* | (2018.01) |
| *G06F 8/34* | (2018.01) |
| *G06F 3/0484* | (2013.01) |
| *G06F 3/0486* | (2013.01) |

(52) U.S. Cl.
CPC ............. *G06F 9/453* (2018.02); *G06F 8/34* (2013.01); *G06Q 10/0633* (2013.01); *G06F 3/0486* (2013.01); *G06F 3/04842* (2013.01); *G06F 3/04845* (2013.01)

(58) Field of Classification Search
CPC ..... G06F 8/20; G06F 8/34; G06F 8/38; G06F 3/0486; G06F 3/0482; G06F 3/04845; G06F 3/0481
See application file for complete search history.

(56) References Cited

U.S. PATENT DOCUMENTS

| | | | | |
|---|---|---|---|---|
| 6,944,622 | B1* | 9/2005 | Mitchell | G06Q 10/103 |
| 2002/0070953 | A1* | 6/2002 | Barg | G06Q 10/10 |
| | | | | 715/700 |
| 2006/0085245 | A1* | 4/2006 | Takatsuka | G06Q 10/0631 |
| | | | | 705/7.12 |
| 2007/0011624 | A1* | 1/2007 | Olsen | G06Q 10/10 |
| | | | | 715/811 |
| 2007/0094367 | A1* | 4/2007 | Esfahany | G06F 9/5077 |
| | | | | 709/223 |

(Continued)

OTHER PUBLICATIONS

"VMware vCenter Operations Capacity Planning & Management: Dashboard Overview" Published on Mar. 16, 2012 https://www.youtube.com/watch?v=9_4S_pOrvOg.*

*Primary Examiner* — Rinna Yi
(74) *Attorney, Agent, or Firm* — Clayton, McKay & Bailey, PC

(57) ABSTRACT

In a method of workspace modeling, a user selection of a step is received at a workflow region of a workspace modeler, the workflow region including a plurality of steps. At least one step of the plurality of steps is unavailable for user selection prior to satisfaction of a prerequisite condition associated with another step of the plurality of steps. Available steps of the plurality of steps are selectable in any order. Access to objects associated with the step is provided in response to the user selection of the step. The objects are selectable by the user for respective inclusion in a content region of the workspace modeler. A user selection of an object is received at the workflow region, and a visualization of the object is added to the content region. The visualization remains persistent within the content region regardless of a user selection of a different step.

17 Claims, 25 Drawing Sheets

(56) References Cited

U.S. PATENT DOCUMENTS

| | | | |
|---|---|---|---|
| 2009/0281677 A1* | 11/2009 | Botich | G06Q 10/00 |
| | | | 700/295 |
| 2012/0311475 A1* | 12/2012 | Wong | G06F 11/3003 |
| | | | 715/772 |
| 2014/0165176 A1* | 6/2014 | Ow | H04L 63/10 |
| | | | 726/8 |
| 2016/0004515 A1* | 1/2016 | Baeck | G06F 8/30 |
| | | | 717/109 |
| 2016/0070430 A1* | 3/2016 | Kim | G06F 3/0486 |
| | | | 715/769 |
| 2016/0179925 A1* | 6/2016 | Hsu | G06F 17/30424 |
| | | | 707/722 |
| 2016/0188370 A1* | 6/2016 | Razin | G06F 11/30 |
| | | | 718/104 |

* cited by examiner

330
Unavailable

2. Presentation

332
Available

2. Presentation

334
Completed

≫ 2. Presentation

FIG. 3B

| Name ▲ | Adapter Type | Object Type | Alert Type | Alert Subtype | Criticality | Impact | Defined by |
|---|---|---|---|---|---|---|---|
| A fatal error occurred on a PCIe bus during system reboot | vCenter Adapter | Host System | Hardware (OSI) | Availability | △ | ☐ Health | vCenter Adapter |
| A fatal memory error was detected at system boot time | vCenter Adapter | Host System | Hardware (OSI) | Availability | △ | ☐ Health | vCenter Adapter |
| A node may be down and it is failing to report any Objects. If HA is disabled, it will impact performance and cause some operations to fail. | vRealize Operations Adapter | vRealize Operations Adapter | Application | Performance | △ | ☐ Health | vRealize Operations Adapter |
| A PCIe error occurred during system boot, but the error is recoverable | vCenter Adapter | Host System | Hardware (OSI) | Availability | △ | ☐ Health | vCenter Adapter |
| A problem occurred with a vCenter component | vCenter Adapter | vCenter Server | Virtualization/... | Availability | △ | ☐ Health | vCenter Adapter |
| A recoverable memory error has occurred on the host | vCenter Adapter | Host System | Hardware (OSI) | Availability | △ | ☐ Health | vCenter Adapter |
| A storage device for a datastore has been detected to be off | vCenter Adapter | Datastore | Storage | Availability | △ | ☐ Health | vCenter Adapter |
| Adapter instance object has error status | All Adapter Types | All Object Types | Application | Availability | △ | ☐ Health | vRealize Operations Adapter |
| Adapter instance Object is down | All Adapter Types | All Object Types | Application | Availability | △ | ☐ Health | vRealize Operations Adapter |
| Battery sensors are reporting problems | vCenter Adapter | Host System | Hardware (OSI) | Availability | △ | ☐ Health | vCenter Adapter |
| BMC sensors are reporting problems | vCenter Adapter | Host System | Hardware (OSI) | Availability | △ | ☐ Health | vCenter Adapter |
| Collector clock is not synchronized with the main server | vRealize Operations Adapter | vRealize Operations Collector | Application | Performance | △ | ☐ Health | vRealize Operations Adapter |
| Data migration from vCenter Operations Manager 5.x system has failed | vRealize Operations Adapter | vRealize Operations Collector | Application | Availability | △ | ☐ Health | vRealize Operations Adapter |
| Database storage capacity is running low for the vRealize Operations Manager Cluster | vRealize Operations Adapter | vRealize Operations Collector | Application | Performance | △ | ☐ Health | vRealize Operations Adapter |
| Datastore has lost connectivity to a storage device | vCenter Adapter | Datastore | Storage | Availability | △ | ☐ Health | vCenter Adapter |
| Datastore has one or more hosts that have lost redundant paths to a storage device | vCenter Adapter | Datastore | Storage | Availability | △ | ☐ Health | vCenter Adapter |
| Datastore has unexpected high disk I/O workload | vCenter Adapter | Datastore | Storage | Performance | △ | ☐ Health | vCenter Adapter |
| Datastore is consuming disk space in a rapid and unexpected manner | vCenter Adapter | Datastore | Storage | Capacity | △ | ☐ Health | vCenter Adapter |

```
┌─────────────────────────────────────────────────────────────┐
│ PROVIDE AN INSTRUCTIONAL REGION WITHIN THE WORKSPACE MODELER,│
│ THE INSTRUCTION REGION FOR PRESENTING GUIDANCE TO A USER    │
│ RELATED TO OPERATION OF THE WORKSPACE MODELER.              │
│ 710                                                          │
└─────────────────────────────────────────────────────────────┘
                              ↓
┌─────────────────────────────────────────────────────────────┐
│ RECEIVE A USER SELECTION OF A STEP AT A WORKFLOW REGION OF A│
│ WORKSPACE MODELER, THE WORKFLOW REGION COMPRISING A PLURALITY│
│ OF STEPS, WHEREIN AT LEAST ONE STEP OF THE PLURALITY OF STEPS│
│ IS UNAVAILABLE FOR USER SELECTION PRIOR TO SATISFACTION OF A │
│ PREREQUISITE CONDITION ASSOCIATED WITH ANOTHER STEP OF THE  │
│ PLURALITY OF STEPS, AND WHEREIN AVAILABLE STEPS OF THE      │
│ PLURALITY OF STEPS ARE SELECTABLE IN ANY ORDER BY A USER.   │
│ 720                                                          │
│ ┌─────────────────────────────────────────────────────────┐ │
│ │ PROVIDE A CONTEXTUAL INSTRUCTIONAL MESSAGE RELATED TO AN│ │
│ │ AREA OF INTERACTION IN RESPONSE TO A USER INTERACTION   │ │
│ │ WITH THE WORKFLOW REGION.                               │ │
│ │ 722                                                      │ │
│ └─────────────────────────────────────────────────────────┘ │
└─────────────────────────────────────────────────────────────┘
                              ↓
┌─────────────────────────────────────────────────────────────┐
│ PROVIDE ACCESS TO A PLURALITY OF OBJECTS ASSOCIATED WITH THE│
│ STEP IN RESPONSE TO THE USER SELECTION OF THE STEP, WHEREIN │
│ THE PLURALITY OF OBJECTS ARE SELECTABLE BY THE USER FOR     │
│ INCLUSION IN A CONTENT REGION OF THE WORKSPACE MODELER.     │
│ 730                                                          │
│ ┌─────────────────────────────────────────────────────────┐ │
│ │ TOGGLE AN ACCORDION VIEW OF THE STEP.                   │ │
│ │ 732                                                      │ │
│ └─────────────────────────────────────────────────────────┘ │
└─────────────────────────────────────────────────────────────┘
                              ↓
┌─────────────────────────────────────────────────────────────┐
│ RECEIVE A USER SELECTION OF AN OBJECT AT THE WORKFLOW REGION│
│ 740                                                          │
│ ┌─────────────────────────────────────────────────────────┐ │
│ │ RECEIVE A DRAG AND DROP OPERATION OF THE OBJECT FROM THE│ │
│ │ WORKFLOW REGION TO THE CONTENT REGION.                  │ │
│ │ 742                                                      │ │
│ └─────────────────────────────────────────────────────────┘ │
└─────────────────────────────────────────────────────────────┘
                              ↓
                             (A)
```

ADD A VISUALIZATION OF THE OBJECT TO THE CONTENT REGION IN RESPONSE TO THE USER SELECTION OF THE OBJECT, WHEREIN THE VISUALIZATION OF THE OBJECT REMAINS PERSISTENT WITHIN THE CONTENT REGION REGARDLESS OF A USER SELECTION OF A DIFFERENT STEP OF THE AVAILABLE STEPS.
750

PROVIDE AN INDICATION THAT THE STEP IS COMPLETED IN RESPONSE TO A USER COMPLETING MINIMUM REQUIREMENTS FOR THE STEP.
760

INDICATE THAT THE ANOTHER STEP IS AVAILABLE FOR USER SELECTION IN RESPONSE TO A USER COMPLETING THE STEP AND SATISFACTION OF A PREREQUISITE CONDITION ASSOCIATED WITH ANOTHER STEP OF THE PLURALITY OF STEPS.
770

*FIG. 7B*

METHOD OF WORKSPACE MODELING

BACKGROUND

A software wizard is a typical user interface used for assisting a user in achieving a desired result by guiding the user through a series of well-defined steps. For example, an organizational administrator tasked with managing a computing infrastructure, such as a virtualization infrastructure, frequently create reports and views to aid in their administration. Reports and views are visualizations of actual data provided by the managed infrastructure. Currently, software wizards are typically utilized in allowing an administrator to generate such reports and views.

While there many situations in which a software wizard may be useful (e.g., troubleshooting, users with limited knowledge, etc.), software wizards often have limitations that may impair or minimize their usefulness. For example, software wizards require that a user move linearly through a sequence of steps. Each step must be completed in the order it is presented, and if it is necessary to go back to an earlier step, it is typically necessary to repeat all intervening steps. Moreover, wizards often do not allow the user to visualize completed steps and input, requiring the user to proceed through successive steps without providing context from the earlier steps.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 3B illustrates example views of available states of a step within a workflow region of a workspace modeler, according to embodiments.

FIGS. 6A-H illustrate example screen shots of a second use case of a workspace modeler, according to embodiments.

FIGS. 7A and 7B are flow diagram of example operations of a method of workspace modeling, according to various embodiments.

DESCRIPTION OF EMBODIMENTS

Figure 1:
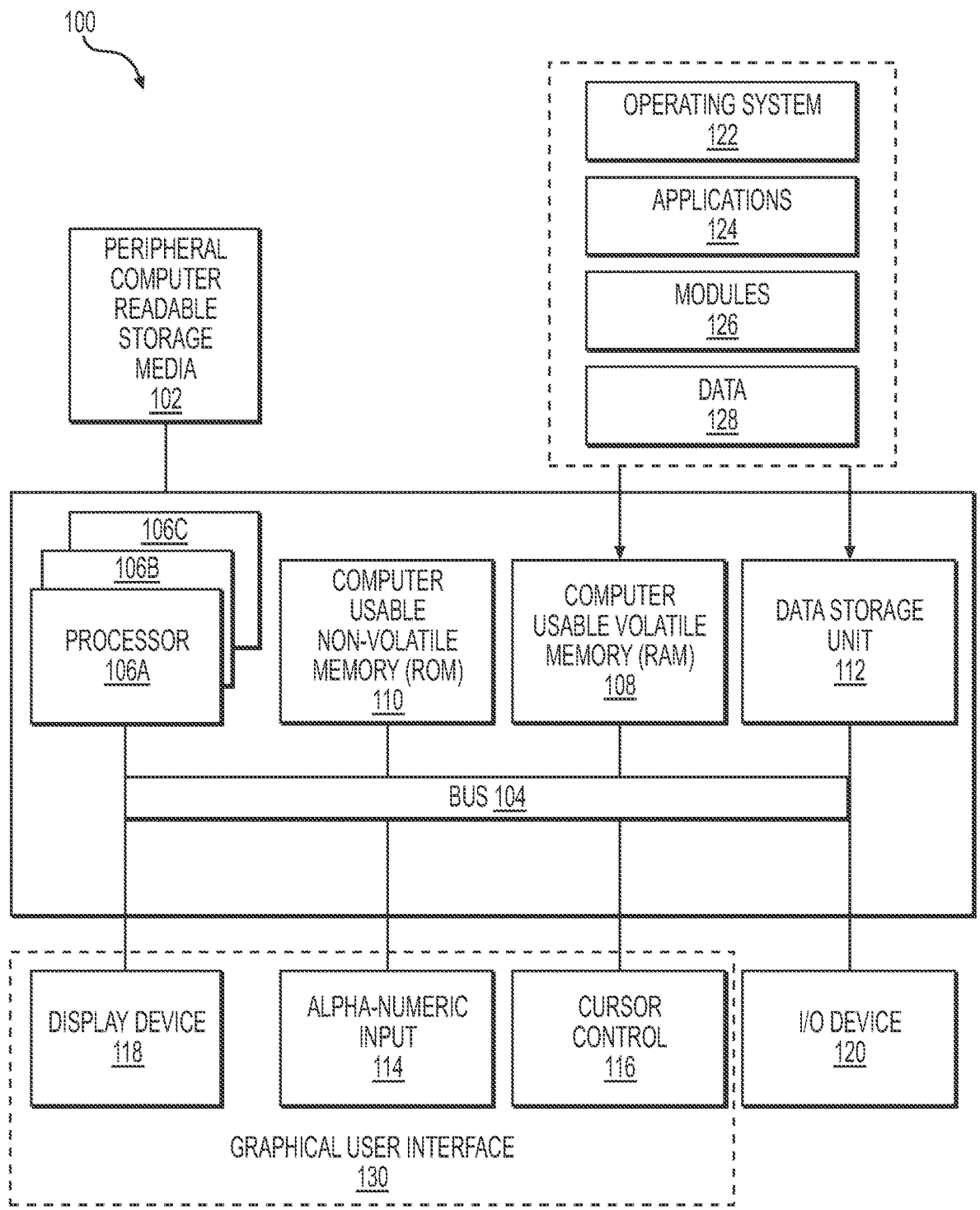
FIG. 1 illustrates an example computer system upon which embodiments of the present invention can be implemented.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "receiving," "providing," "adding," "toggling," "presenting," "indicating," "rendering," "displaying," or the like, often refer to the actions and processes of an electronic computing device or system, such as a virtualization management server or a virtual machine (VM), among others, of a virtualization infrastructure or a computer system of a distributed computing system. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

As previously described in the background, software wizards, while useful in certain situations, have limitations that may impair or minimize their usefulness. Software wizards require a user to linearly follow a sequence of steps which must be completed in the order the step is presented. Often some steps are unnecessary for the user's particular needs, yet all the steps must be completed to some extent for a conventional software wizard to proceed to following steps. Also, if a user wants to go back to an earlier step, it is typically necessary to repeat all intervening steps. Moreover, wizards do not allow the user to visualize completed steps and input, requiring the user to proceed through successive steps without providing context from the earlier steps.

In accordance with various described embodiments, a workspace modeler for modeling an item is provided. A workspace modeler provides a user with an interface for modeling an item (e.g., a report, a view, or an alert definition) while presenting a user with available actions (e.g., steps) and for presenting persistent visualization of selected objects from the available steps. For example, a workspace modeler is useful for complex workflows that can be broken down into multiple steps while still maintaining the context of the item being modeled, resulting in more manageable workflows than when using a software wizard. Another advantage of a workspace modeler when compared to a software wizard lies in the ability to go back and forth between various steps, while still allowing the user to affect the item being modeled. The item being modeled is persistently viewable even as the user moves to different steps of the workflow, allowing the user to view the item as different steps effect the appearance of the item. Moreover, users can visit steps in any order and may not need to visit or complete every step in order to complete a workflow.

Embodiments described herein provide a workspace modeler including a workflow region and a content region, where the workflow region includes a plurality of steps. The workspace modeler is configured to receive a user selection of a step at a workflow region of the workspace modeler. In one embodiment, at least one step of the plurality of steps is unavailable for user selection prior to satisfaction of a prerequisite condition associated with another step of the plurality of steps. Moreover, the available steps of the plurality of steps are selectable in any order by the user.

Responsive to the user selection of a step, the workspace modeler provides access to a plurality of objects associated with the step. The objects are selectable by the user for inclusion in the content region of the workspace modeler. Responsive to a user selection of an object, a visualization of the object is added to the content region. The visualization of the object remains persistent within the content region regardless of a user selection of a different step of the available steps.

Embodiments of the present invention utilize a computer system having a graphical user interface including a display device and a user interface selection device to provide a method of workspace modeling. A workspace modeler is provided for rendering on the display device. The workspace modeler includes a workflow region and a content region. The workflow region includes a plurality of steps available for user selection. At least one step of the plurality of steps is unavailable for user selection prior to satisfaction of a prerequisite condition associated with another step of the plurality of steps. In one embodiment, available steps of the plurality of steps are presented in a suggested order and selectable in any order by a user. In response to a user selection of the step, access to a plurality of objects associated with the step is provided. The objects are selectable by the user for inclusion in the content region of the workspace modeler. The content region includes at least one visualization of an object responsive to a selection of the object in the workflow region. The visualization of the object remains persistent within the content region regardless of a user selection of a different step of the available steps. In one embodiment, in response to a user completing the step and satisfying a prerequisite condition associated with another step of the plurality of steps, the workspace modeler indicates that another step is available for user selection and indicates that the step is completed.

Discussion begins with a description of an example computer system environment upon which embodiments of the present technology may be implemented. An example workspace modeler is then described. Operation of various example processes involved in workspace modeling are then described.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disk, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disk and disk drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof, may collectively operate to provide a graphical user interface (GUI) 130 under the direction of a processor (e.g., processor 106A or processors 106A, 106B, and 106C).

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Example Workspace Modeler

Embodiments described herein provide a workspace modeler including a workflow region and a content region, where the workflow region includes a plurality of steps. The workspace modeler is configured to receive a user selection of a step at a workflow region of the workspace modeler. In one embodiment, at least one step of the plurality of steps is unavailable for user selection prior to satisfaction of a prerequisite condition associated with another step of the plurality of steps. Moreover, the available steps of the plurality of steps are selectable in any order by the user.

Responsive to the user selection of a step, the workspace modeler provides access to a plurality of objects associated with the step. The objects are selectable by the user for inclusion in the content region of the workspace modeler. Responsive to a user selection of an object, a visualization of the object is added to the content region. The visualization of the object remains persistent within the content region regardless of a user selection of a different step of the available steps.

Figure 2:
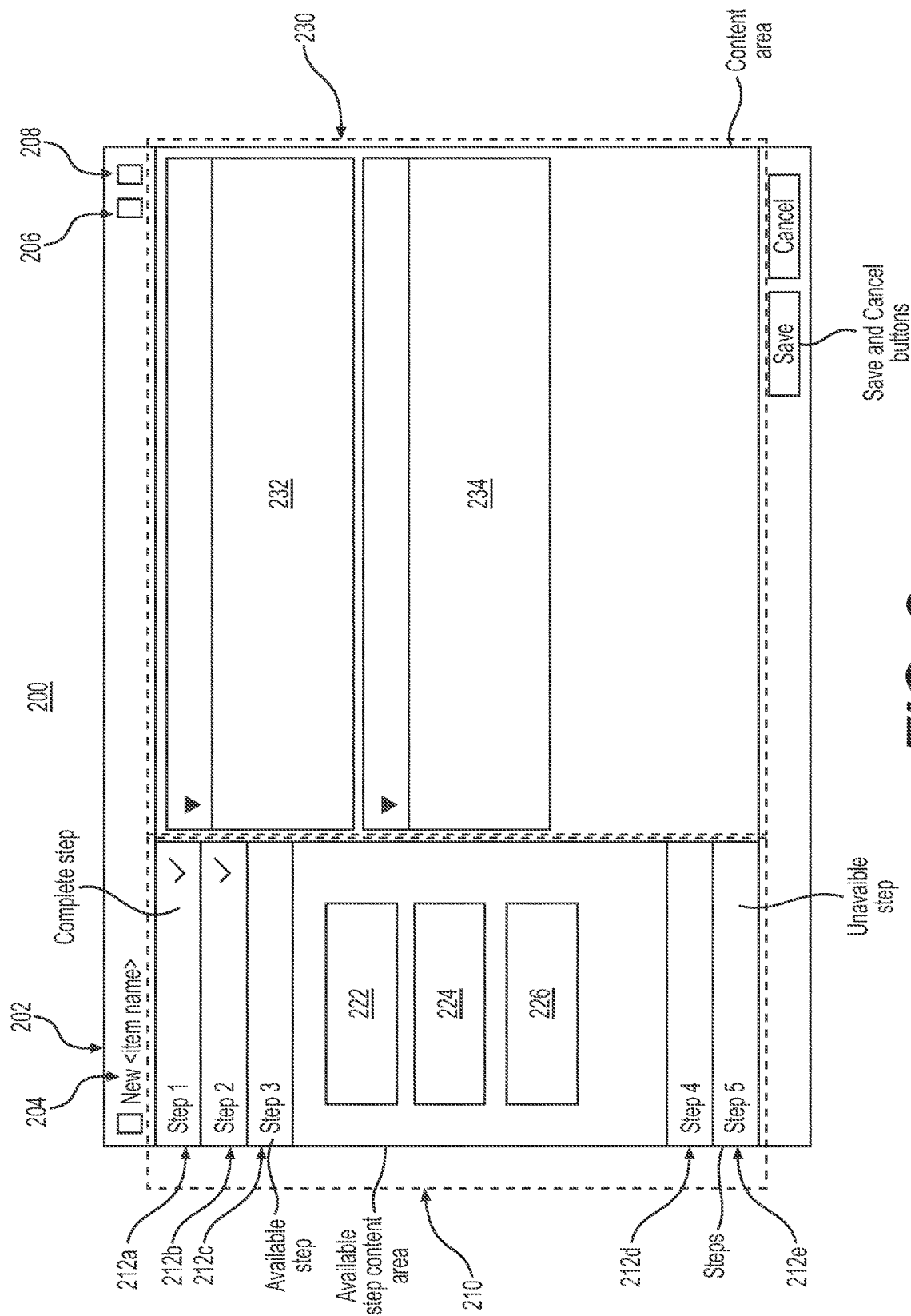
FIG. 2 is a workspace modeler implemented within a graphical user interface (GUI), in accordance with embodiments.

FIG. 2 is a workspace modeler 200 implemented within a graphical user interface (GUI), in accordance with embodiments. In one embodiment, workspace modeler 200 includes window title bar 202 including title 204, help icon 206 and close icon 208. Title 204 provides a descriptive title indicative of the item being generated using workspace modeler 200. In one embodiment, title bar 202 includes an optional logo. Help icon 206 provides an interactive element allowing a user to request additional information about the data requested in workspace modeler 200. In one embodiment, contextual help is provided via an instructional region (also referred to as an instructional pane) provided within workspace modeler 200.

Workspace modeler 200 includes workflow region 210 and content region 230. It should be appreciated that workflow region 210 and content region 230 may also be referred to herein as workflow pane 210 and content pane 230, respectively. Workflow region 210 includes a plurality of steps 212a-212e. It should be appreciated that workflow region 210 can include any number of steps, and that the number used herein is for illustrative purposes. In one embodiment, the steps of workflow region 210 are in one of three states: unavailable, available or completed:

Unavailable: When a prerequisite condition for a step has not been met (e.g., when its preceding step has not yet been finished or information in an earlier step is required in the step). A user cannot access an unavailable step as its interactivity is disabled.

Available: When a step has no prerequisite condition or its prerequisite condition has been met (e.g., the preceding step has been finished). A user can access an available step as its interactivity is enabled.

Completed: When the minimum requirements for the current step are completed successfully (e.g., while creating a new report, adding a single view to the report satisfies the minimum requirement for the 'Add content to the report' step, and makes the next step 'Select formats' available to the user). A user can access a completed step as its interactivity is enabled.

In various embodiments, contextual help information may be provided for steps. In one embodiment, contextual help information becomes visible besides the step name as a contextual instructional message. For example, this may be provided in a text box overlying content region 230 next to the particular step. In other embodiments, the contextual help information becomes visible in response to a user interaction with the step (e.g., hover a cursor over the step or interact with a help icon on the step). In one embodiment, the contextual help information for a step becomes available once a step becomes available.

Figure 3A:
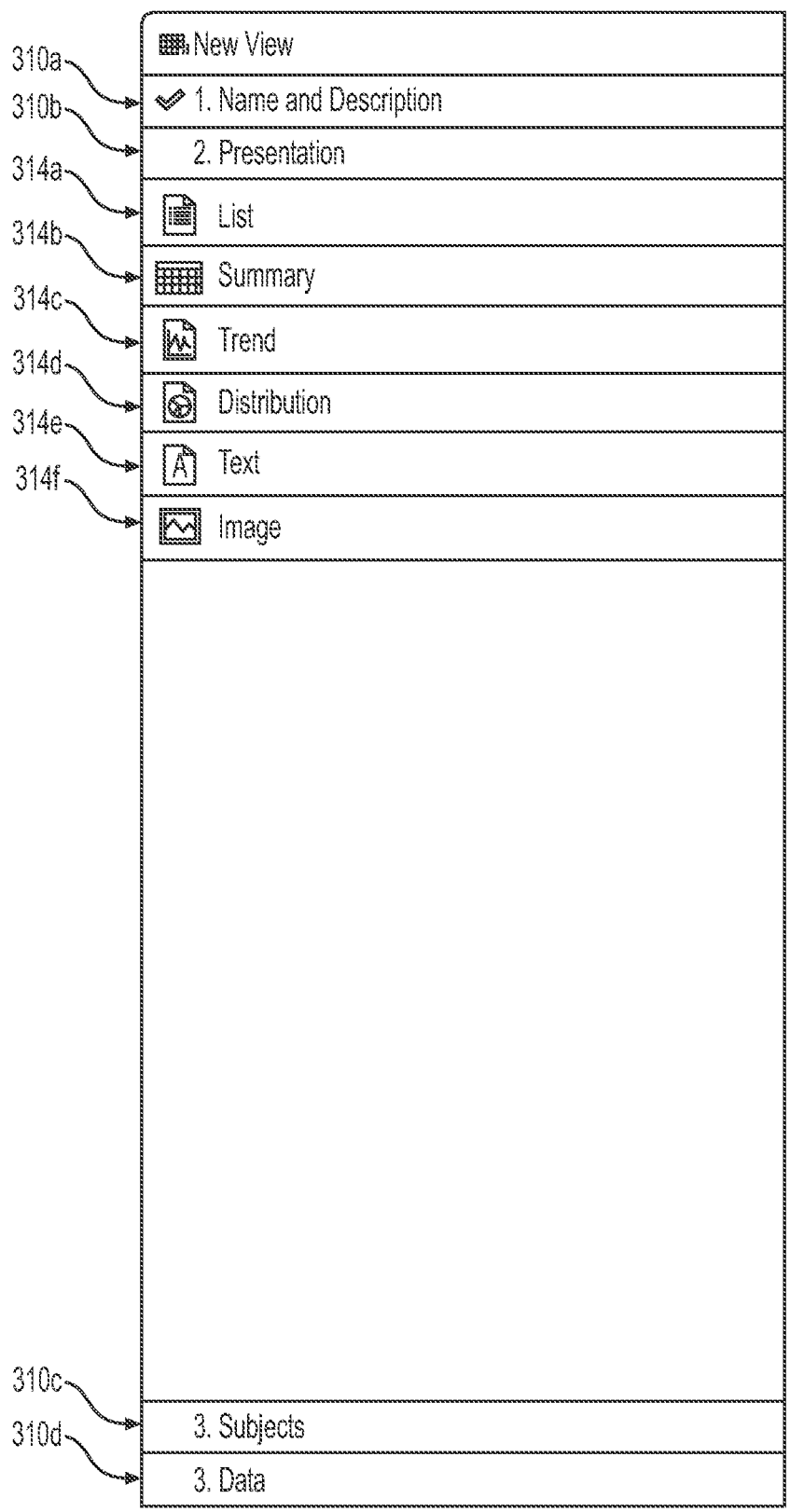
FIG. 3A illustrates an example workflow region of a workspace modeler, according to an embodiment.

With reference to FIG. 3A, an example workflow region 300 of a workspace modeler is illustrated, according to an embodiment. The example workspace modeler including workflow region 300 is for allowing a user to create a view. Accordingly, the steps included in workflow region 300 are designed to allow a user to efficiently effectuate the creation of a view. As shown, example workflow region 300 includes four steps, step 310a (Name and Description), step 310b (Presentation), step 310c (Subjects) and steps 310d (Data), of which step 310b is the currently selected step.

It should be appreciated that steps 310a-d are presented in a suggested order. A user may navigate the available steps in any order (e.g., linearly or non-linearly with respect to the presented order). As steps become available due to the satisfaction of a prerequisite condition, a user may navigate between steps in any order and any number of times. Moreover, in various embodiments, even if a step is indicated as completed, the user may navigate back to the completed step.

In the illustrated embodiment, the user has currently selected step 310b. Step 310b includes six selectable objects 314a-f (e.g., List, Summary, Trend, Distribution, Text and Image, respectively). Responsive to a user selection of a step, the user is provided access to objects within the selected step. In one embodiment, the user selection of a step includes toggling an accordion view of the selected step. The accordion view provides an expanded view of the objects available within the selected step. It should be appreciated that where screen size limits the number of objects that can be displayed, a scroll bar within the accordion view of may be used to allow a user to access all objects within a step. Moreover, it should be appreciated that other types of views for accessing the objects within a step may be implemented, including but not limited to: a drop-down menu, a tabbed interface, an auxiliary window, a new pane, etc.

As shown in FIGS. 2 and 3A, the steps of workflow region 210 and 300, respectively, are in one of three states: unavailable, available or completed. With reference to FIG. 3B, example views of available states of a step within a workflow region of a workspace modeler are illustrated, according to various embodiments. State examples 330, 332 and 334 illustrate different views for the available states of a step.

With reference to FIG. 3B, unavailable state example 330 illustrates an example view for an unavailable step. In the shown embodiment, the step is indicated as unavailable by reducing the visibility of the text label for the step relative to the visibility of the text label for an available step (e.g., available state example 332). It should be appreciated that other visual indicators may be used to indicate the unavailability of a step. For example, and without limitation, using a different color font (such as red or gray) for the text label of the step, using a strikethrough of the text label, or using a text descriptor (such as "unavailable"), may also indicate that a step is unavailable. As described above, a step may be unavailable when a prerequisite condition for the step has not been met (e.g., when its preceding step has not yet been finished or information in an earlier step is required in the step). A user cannot access an unavailable step as its interactivity is disabled Available state example 332 illustrates an example view for an available step. In the shown embodiment, the step is indicated as available by increasing the visibility of the text label for the step relative to the visibility of the text label for the unavailable state. It should be appreciated that other visual indicators may be used to indicate the unavailability of a step. For example, and without limitation, using a different color font (such as green or black) for the text label of the step, using a bold effect on the text label, or using a text descriptor (such as "available"), may also indicate that a step is unavailable. As described above, a step may be available when the step has no prerequisite condition or its prerequisite condition has been met (e.g., the preceding step has been finished). A user can access an available step as its interactivity is enabled.

Completed state example 334 illustrates an example view for an available step. In the shown embodiment, the step is indicated as completed by presenting a check mark next to the text label for the step. It should be appreciated that other visual indicators may be used to indicate the unavailability of a step. For example, and without limitation, using a different color font (such as blue) for the text label of the step, or using a text descriptor (such as "completed"), may also indicate that a step is unavailable. As described above, a step may be completed when the minimum requirements for the current step are completed successfully. A user can access a completed step as its interactivity is enabled.

With reference again to FIG. 2, steps 212a-212e are for directing a user through the workflow for creating the desired item. For example, when designing workspace modeler 200, the designer should consider how to move users efficiently through the workflow. While a user may navigate through the workflow in any order of the available steps, an effective design provides a balance between the number of steps and the number of controls (e.g., objects) per step. For example, while clutter can be a concern when too many controls are included in a step, using too many sparsely-populated steps is also a problem because it requires more clicking on the part of the users.

In various described embodiments, unavailable steps become available as prerequisite conditions are met for the step. For example, step 212b may require entry of a name of the item being generated in step 212a prior to becoming available. Once the name of the item is entered in step 212a, step 212b may then be activated.

In various embodiments, at least one step of workspace modeler 200 includes selectable objects pertaining to information and/or visualizations that can be added to content region 230. As shown in FIG. 2, step 212c includes three objects 222, 224 and 226 for selective inclusion in content region 230. It should be appreciated that the objects within a step are dependent on the type of item being created, and may include any information a user creating the particular item might desire.

Content region 230 is where a visualization associated with a user-selected object (e.g., object 222) can be added from a step in workflow region 210. In one embodiment, a visualization, such as visualization 232 or visualization 234, can be added to content region 230 in response to a user dragging and dropping (e.g., using cursor control device 116 of FIG. 1) an object from workflow region 210 into content region 230. However, it should be appreciated that objects may be placed in content region 230 in other ways, including: selection, double-clicking a cursor control device, selecting an object from a drop-down menu, or interacting with a selection icon associated with an object.

Example layouts of content region 230 include, without limitation:
Preview and Data configuration model: Content (e.g., an object) dragged over from various steps in workflow region 210 for placement in the content region 230 is first presented in a preview area where settings for the selected content (e.g., in reports, views etc.) are made.
Build as: Content (e.g., an object) dragged over from workflow region 210 is placed directly in content region 230, and the configuration of the content can be undertaken within each visualization associated with the content (e.g., in policies etc.)

The objects within the steps are used to add content into the model being generated. In one embodiment the configuration of the content takes place in the content region 230, where the content is drag-dropped by the user into content region 230.

Figure 4:
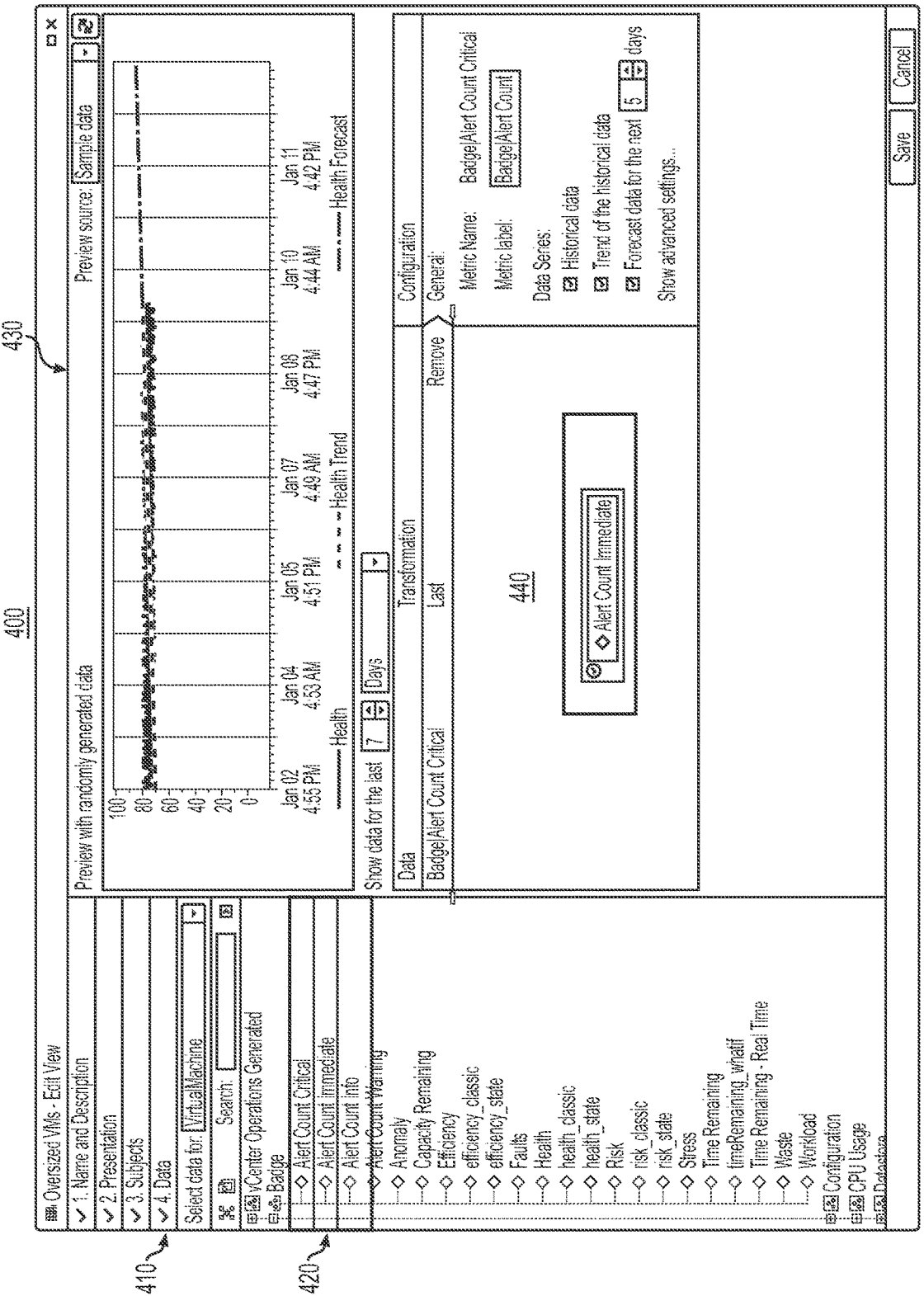
FIG. 4 illustrates an example workspace modeler, according to an embodiment.

FIG. 4 illustrates an example workspace modeler 400, according to an embodiment. As shown, example workspace modeler 400 is creating a view for "Oversized VMs," where VM refers to a virtual machine. Step 410 entitled "4. Data" is the currently selected step, with object 420 entitled "Alert Count Immediate" having been selected for placement in content region 430. Visualization 440 is the visualization of object 420.

Embodiments described herein provide a workspace modeler for allowing a user to create an item, such as a report, a view or an alert definition. For example, the workspace modeler described herein can pull data from an active (or simulation) virtualization infrastructure in providing the created item using real-time data received from a component of the virtualization infrastructure, such as a virtualization management server.

FIGS. 5A-J illustrate example screen shots of a use case of a workspace modeler 500, according to embodiments. As shown, workspace modeler 500 is providing a user with a workflow for creating a report of a virtualization infrastructure. Reports and views are created to aid in the administration of virtualization infrastructures. In various embodiments, reports and views are visualizations of actual data provided by the managed infrastructure.

Figure 5A:
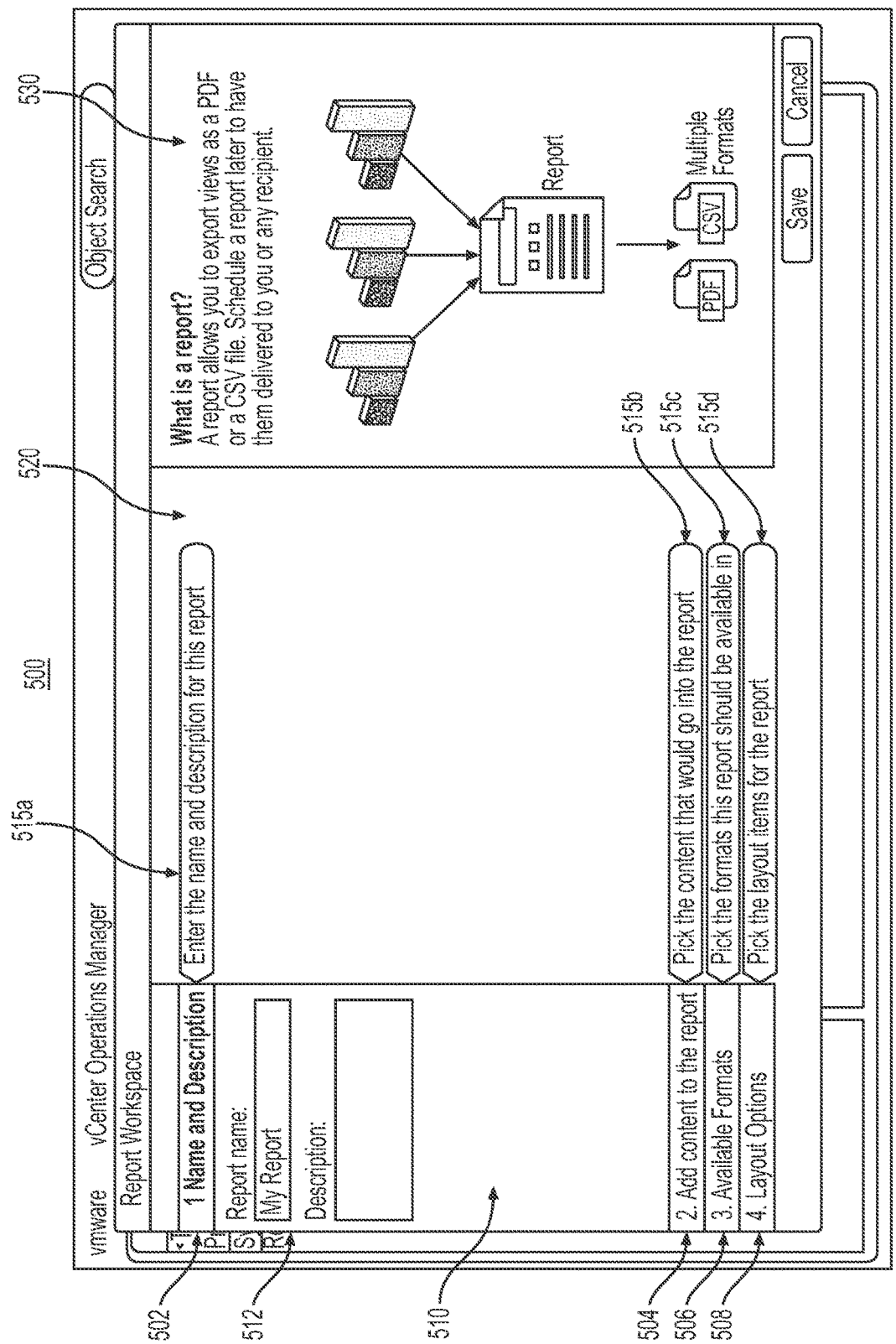
FIGS. 5A-J illustrate example screen shots of a use case of a workspace modeler, according to embodiments.

With reference to FIG. 5A, the user is currently operating within the only available step of workflow region 510, step 502 (entitled "1. Name and Description"). In the illustrated embodiment, field 512 entitled "Report Name" is a prerequisite condition for the activation of step 504. In the current example, field 512 is being populated with the phrase "My Report." Workspace modeler 500 also includes content region 520 which is currently empty as no content has yet been added, and instructional region 530 for presenting guidance to a user related to operation of workspace modeler

500. As shown in FIG. 5A, instructional region 530 provides a general description of a report and the available export formats.

Workspace modeler 500 also includes a plurality of contextual instructional messages 515a-d related to the steps of workflow region 510. For example, contextual instructional message 515a is a text box providing instructional information related to the operation of step 502. In one embodiment, contextual instructional messages 515a-d become visible besides a respective step name upon activation of workspace modeler 500. Contextual instructional messages 515a-d may then stay visible until a user interaction with workspace modeler 500 or until a specified amount of time has elapsed. In other embodiments, contextual instructional messages 515a-d become visible in response to a user interaction with a respective step (e.g., hover a cursor over the step or interact with a help icon on the step). In one embodiment, contextual instructional messages 515a-d become available for a step once the respective step becomes available.

Figure 5B:
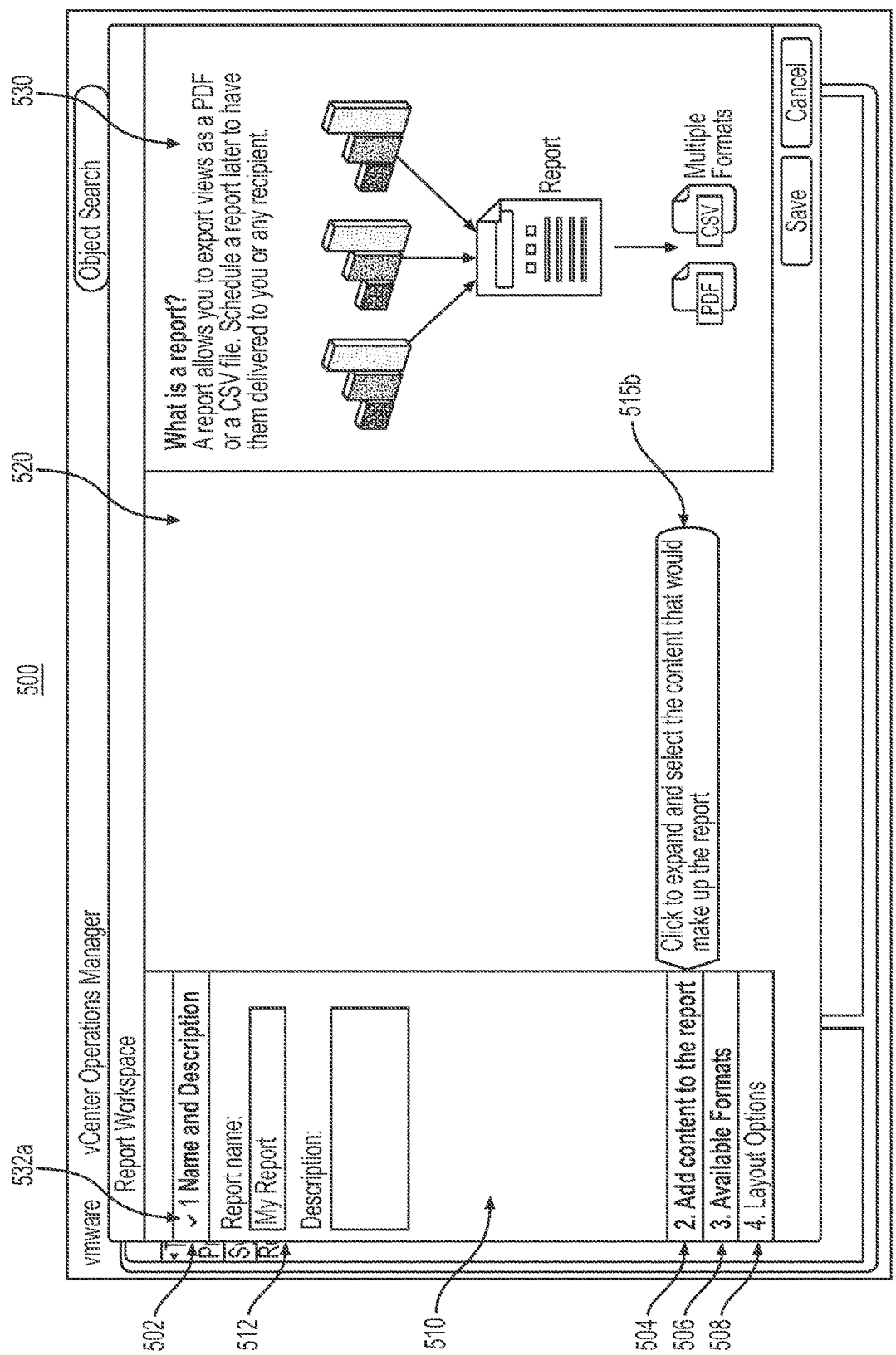

With reference to FIG. 5B, once the user completes entry of field 512, step 504 (entitled "2. Add content to the report") and step 506 (entitled "3. Available Formats") are activated and become available for user interaction. As shown, contextual instructional message 515b related to the operation of step 504 is visible, as step 504 is the next step suggested for user interaction. However, it should be appreciated that a user may interact with any available step. Moreover, step 502 includes an indicator 532a designating that step 502 is complete (e.g., a check mark as shown).

Figure 5C:
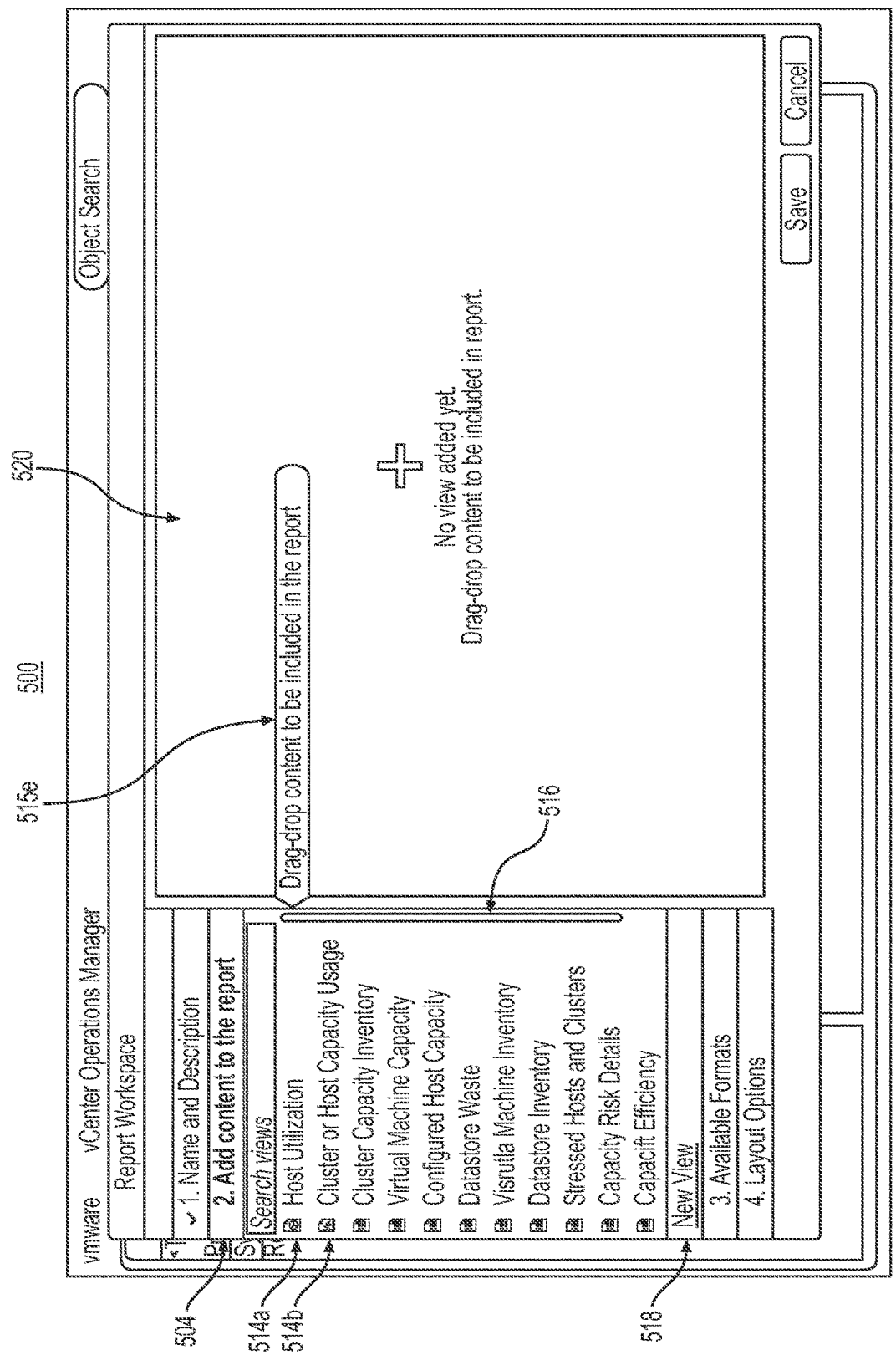

As shown in FIG. 5C, a user has selected step 504, resulting in toggling of an accordion view of step 504. Toggling the accordion view provides an expanded view of objects available within the selected step, e.g., objects 514a and 514b. Scroll bar 516 provides user access to more objects available in step 504. New view 518 allows a user to interact with an object creation interface for objects not created or available within step 504.

Moreover, instructional region 530 of FIGS. 5A and 5B is no longer visible, increasing the area of content region 520. It should be appreciated that instructional region 530 may no longer be visible due to a user closing instructional region 530, an automatic action once a user completes step 502, an automatic action once a user interacts with step 504, or other reasons. Contextual instructional message 515e is a new instructional message explaining to a user how to add objects from step 504 into content region 520 (e.g., "drag-drop content to be included in the report").

Figure 5D:
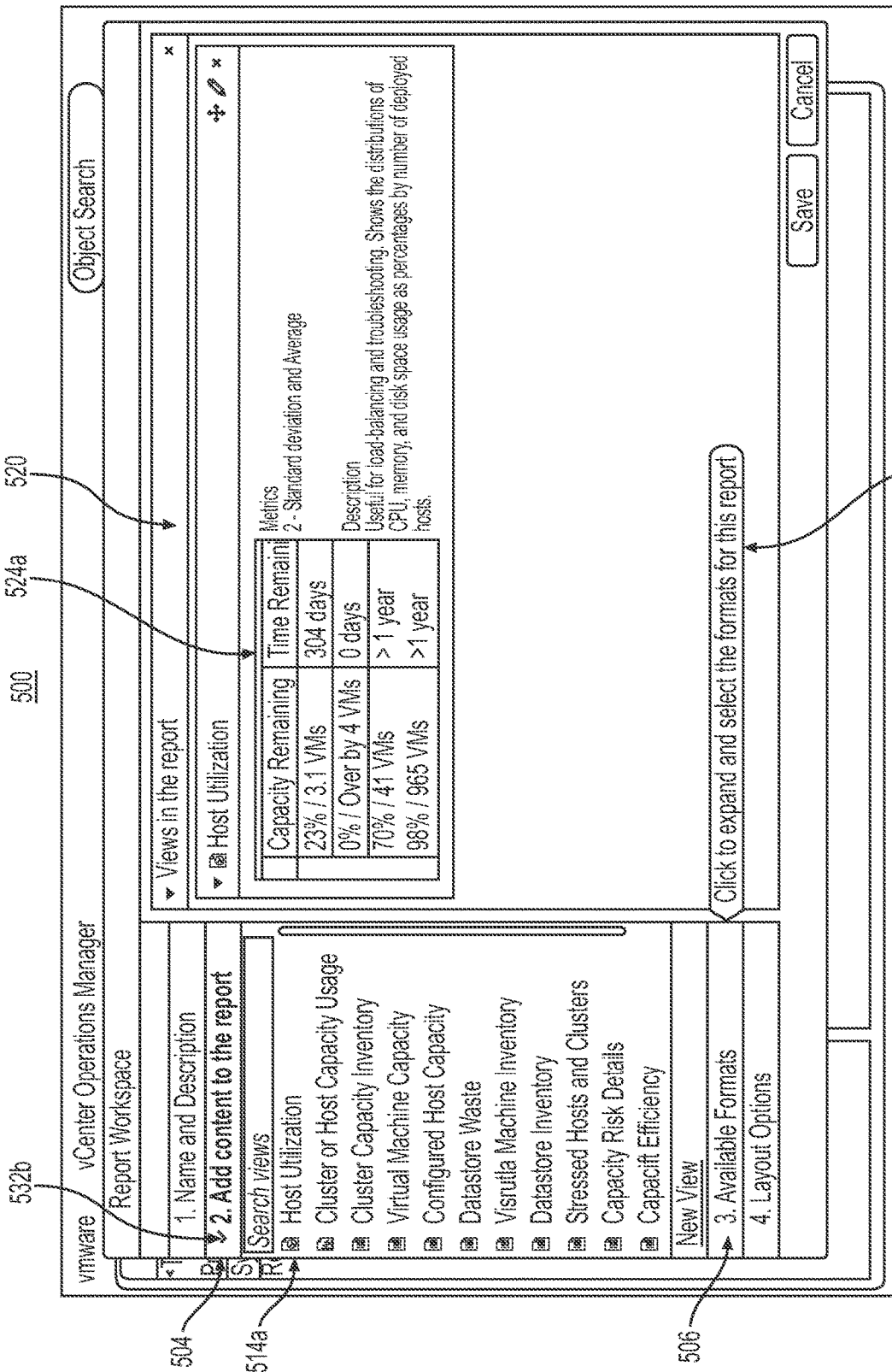

With reference to FIG. 5D, a user has selected object 514a (entitled "Host Utilization") for inclusion in the report. A visualization 524a of object 514a has been added into content region 520 in response to the user selection. Responsive to visualization 524a being added to content region 520, contextual instructional message 515f is visible providing instruction related to the operation of step 506. Moreover, step 504 includes an indicator 532b (e.g., a check mark as shown) designating that step 504 is complete.

Figure 5E:
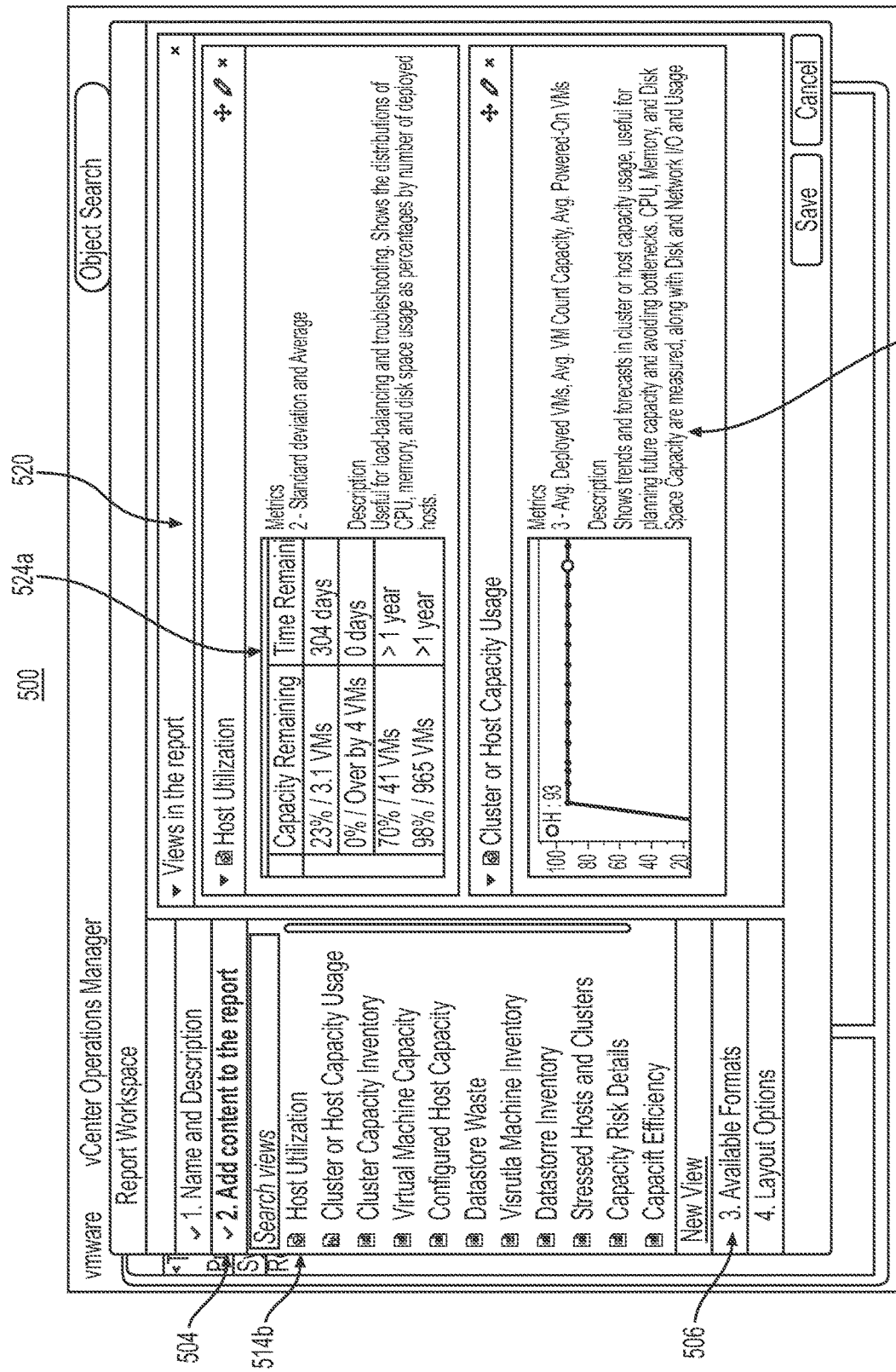

With reference to FIG. 5E, a user has selected object 514b (entitled "Host Utilization") for inclusion in the report. A visualization 524b of object 514b has been added into content region 520 in response to the user selection. It should be appreciated that a user may select any number of objects for inclusion in the report, and that the example of workspace modeler 500 is for illustrative purposes.

Figure 5F:
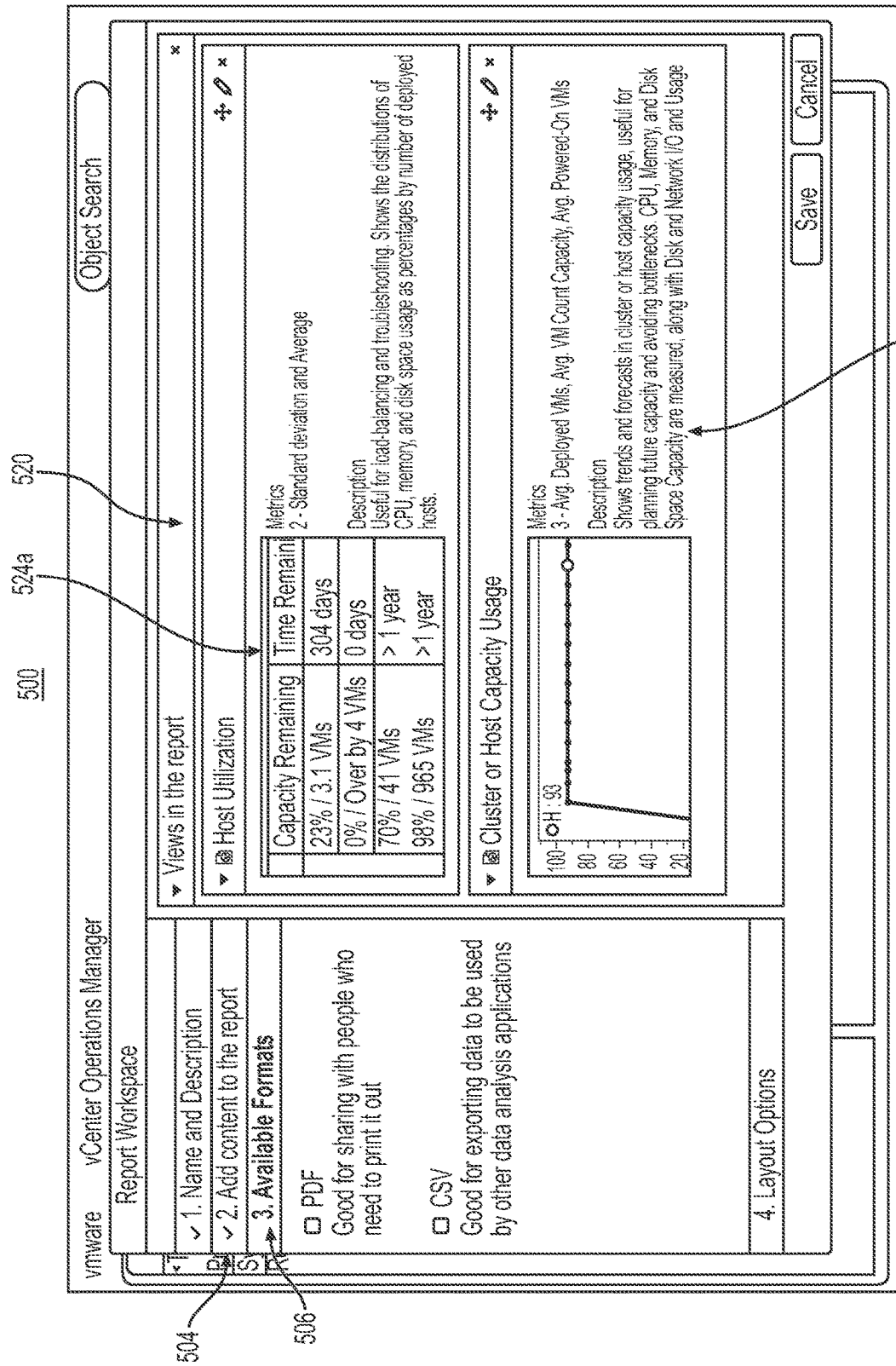

As shown in FIG. 5F, a user has selected step 506, resulting in toggling of an accordion view of step 506. In step 506, the user is presented with available formats for the report being created. It should be appreciated that as a user moves from step 504 to step 506, visualizations 524a and 524b remain persistent within content region 520 regardless of a user selection of a different step of the available steps.

Figure 5G:
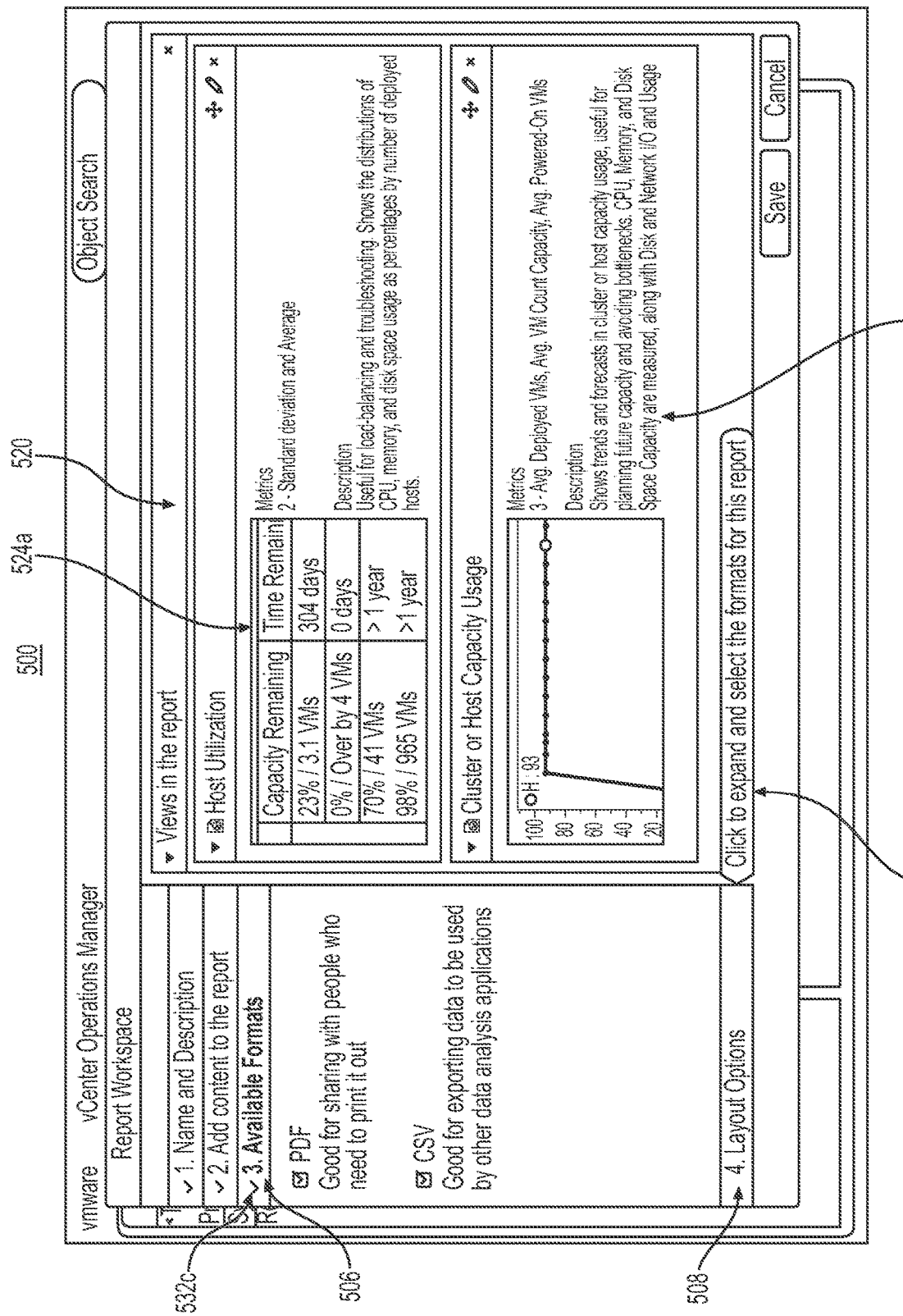

With reference to FIG. 5G, a user has selected available formats, e.g., a PDF file and a comma-separated values (CSV) file for the report. Responsive to user selection of available formats, step 508 (entitled "4. Layout Options") is activated and becomes available for user interaction, and step 506 includes an indicator 532c designating that step 506 is complete. Moreover, contextual instructional message 515g is visible providing instruction related to the operation of step 508 is presented.

Figure 5H:
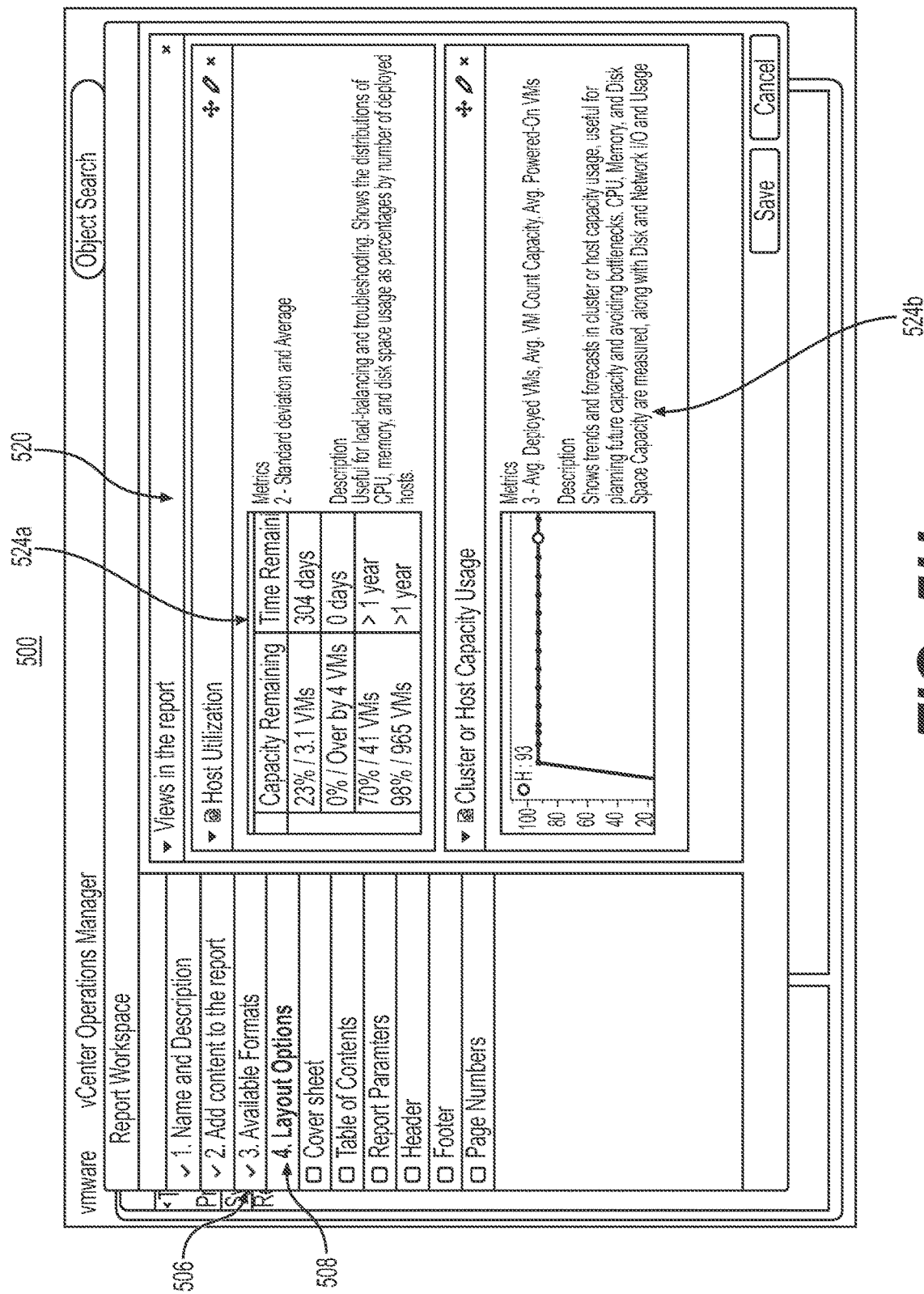

As shown in FIG. 5H, a user has selected step 508, resulting in toggling of an accordion view of step 508. In step 508, layout options are presented for selection. It should be appreciated that as a user moves from step 506 to step 508, visualizations 524a and 524b remain persistent within content region 520 regardless of a user selection of a different step of the available steps.

Figure 5I:
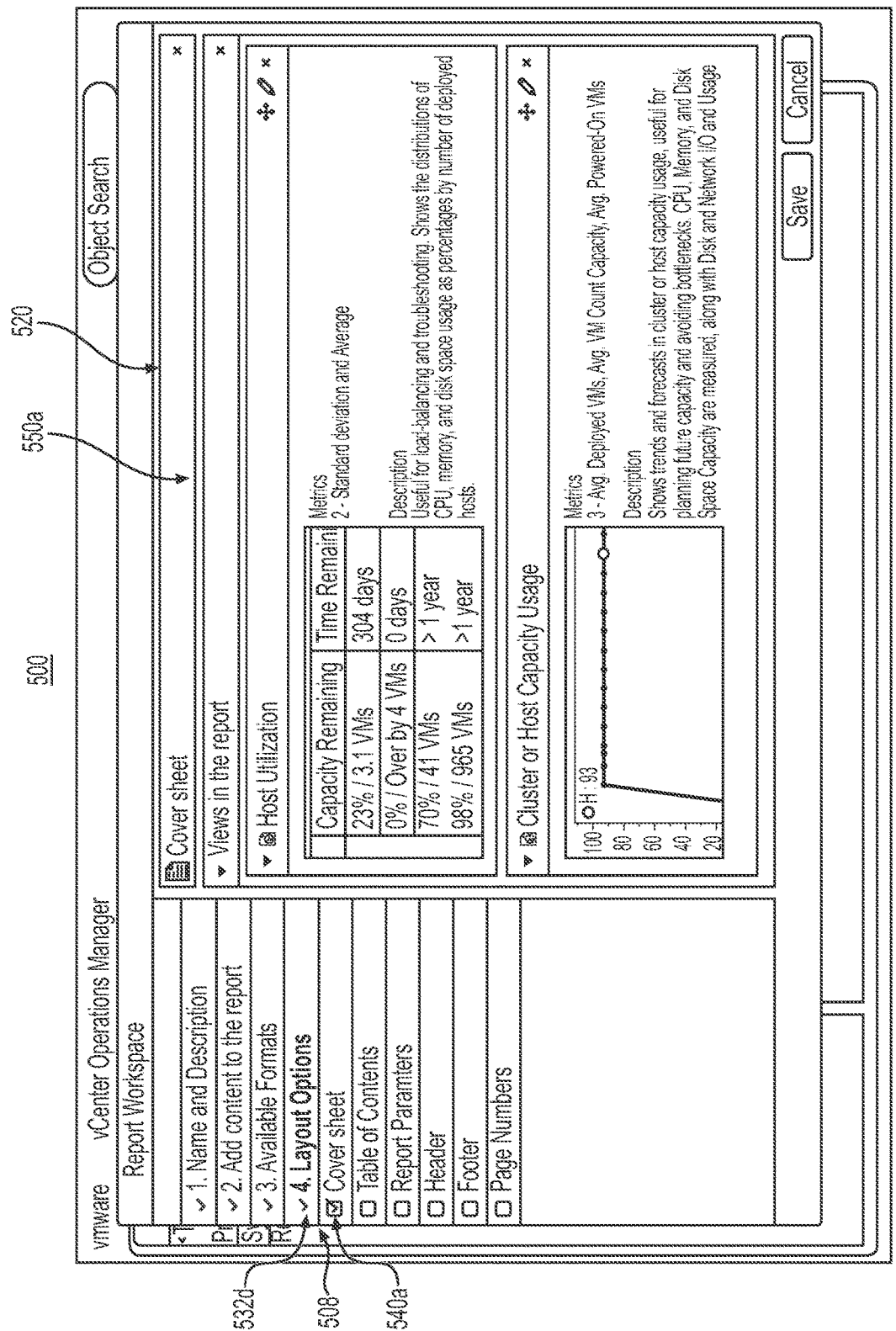

With reference to FIG. 5I, a user has selected a layout option 540a for inclusion in the report. Responsive to user selection layout option 540a, step 508 includes an indicator 532d designating that step 508 is complete. Furthermore, visualization 550a of layout option 540a is added to content region 520.

Figure 5J:
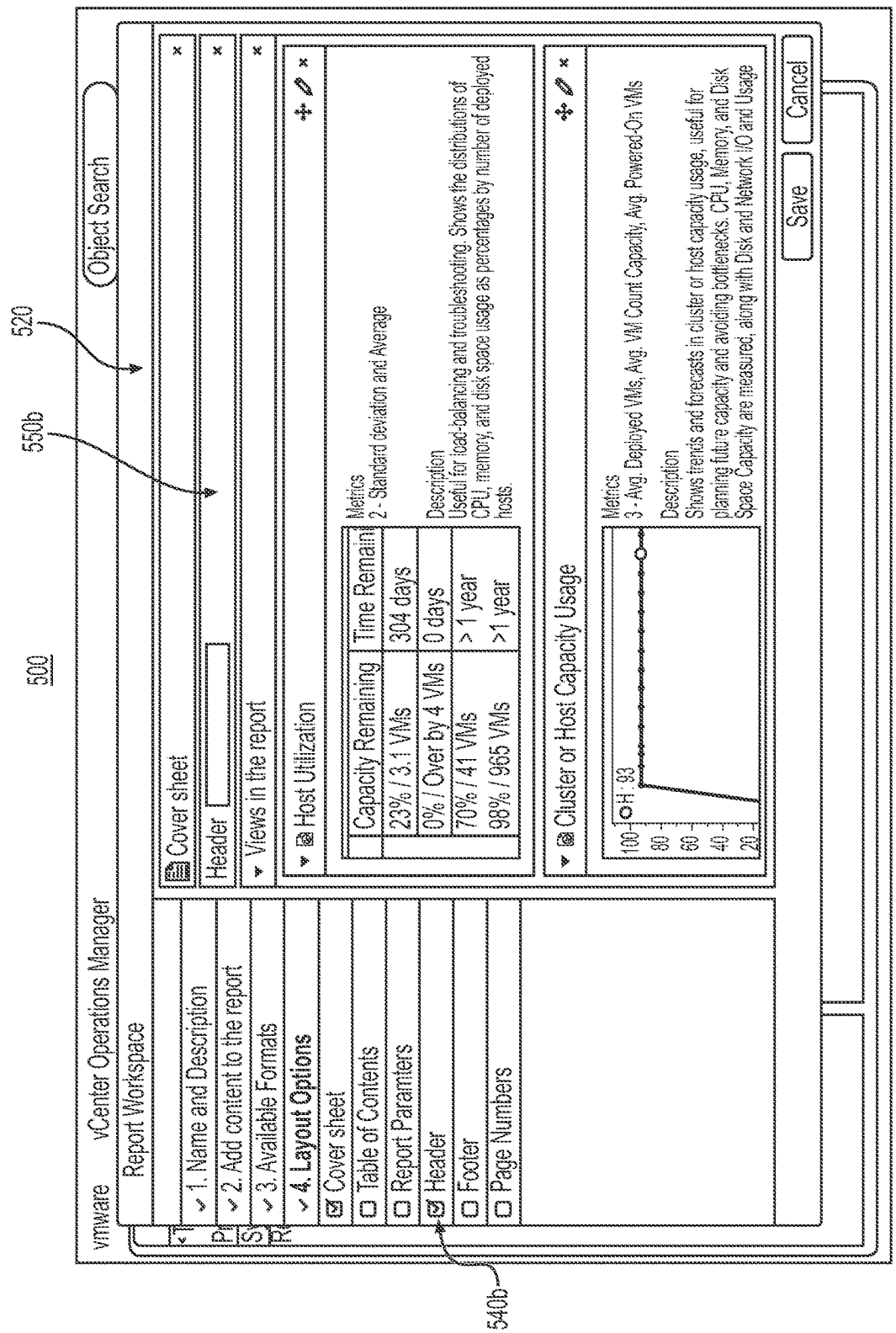

Referring to FIG. 5J, a user has selected a layout option 540b for inclusion in the report. Responsive to user selection layout option 540b, a visualization 550b of layout option 540b is added to content region 520.

FIGS. 6A-H illustrate example screen shots of a second use case of a workspace modeler, according to embodiments. As shown, workspace modeler 600 is providing a user with a workflow for editing an alert definition for a virtualization infrastructure. An alert definition may be created to allow a user to define certain operational conditions of a virtualization infrastructure that warrant a notification, e.g., to a system administrator. For example, an alert definition may be created for indicating a hardware problem in the virtualization infrastructure, allowing the system administrator to take corrective action. As shown in FIGS. 6A-H, an alert definition may be created in a similar manner as a report, as described above.

It should be appreciated that all steps shown in FIGS. 6B-6H are shown as completed such that prerequisite conditions of accessing some steps have already been met. The process of using a workspace modeler for creation of an item is similar to that of editing an item. In the present embodiment, an example of editing an item (alert definition) is shown. In other words, the item has already been created, and a user may use a workspace modeler to edit the item.

With reference to FIG. 6A, a list 660 of alert definitions is presented and available for user selection. By selecting a particular alert definition, a workspace modeler is accessed for modifying or editing the selected alert definition. As shown in FIG. 6A, alert definition 665 (entitled "A fatal error occurred on a PCIe bus during system reboot") is selected.

Figure 6B:
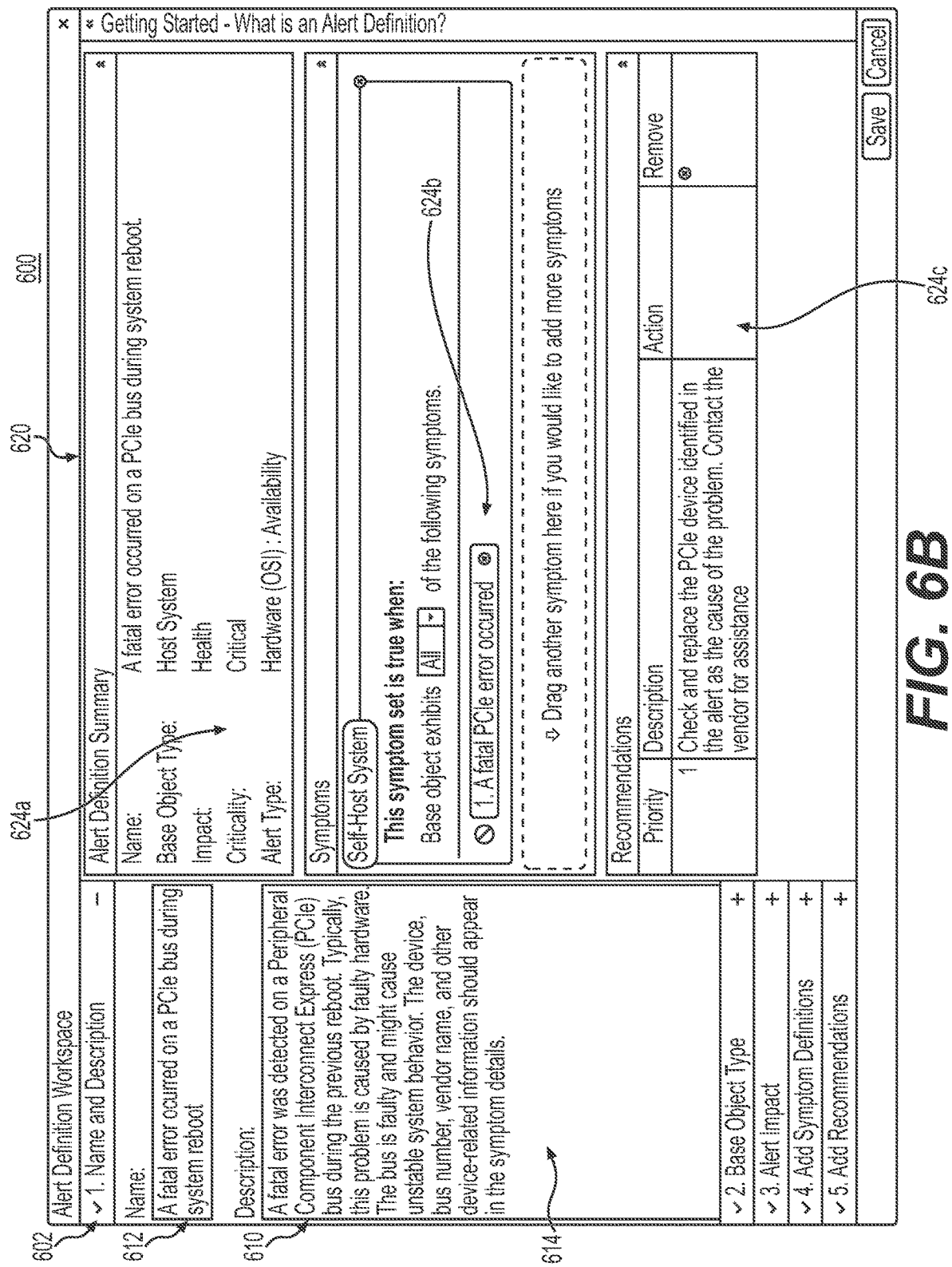

With reference to FIG. 6B, workspace modeler 600 is opened in response to the user selecting alert definition 665. As shown, the user is currently operating within step 602 (entitled "1. Name and Description") of workflow region 610. In the illustrated embodiment, fields 612 and 614 include descriptive text. Moreover, content region 620 includes visualizations 624a, 624b and 624c. As the user moves through the steps of workflow region 610, the visualizations presented in content region 620 remain persistent.

Figure 6C:
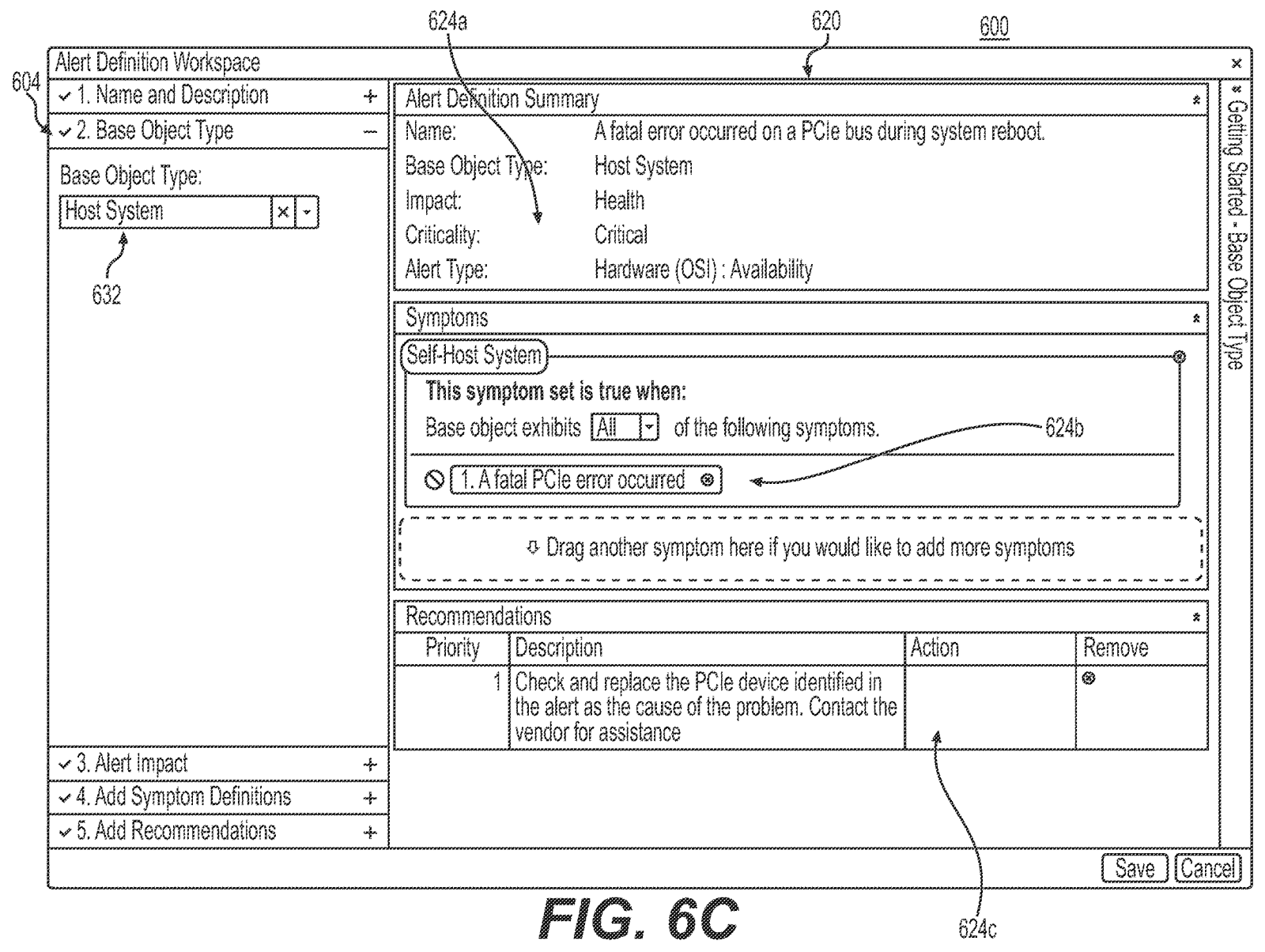

With reference to FIG. 6C, the step 604 (entitled "2. Base Object Type") has been selected. Step 604 includes a selectable drop-down menu 632. As shown, visualizations 624a, 624b and 624c remain persistent within content region 620. Visualization 624a is a summary of the alert definition created and a portion of its contents are impacted by the selection made in drop-down menu 632.

Figure 6D:
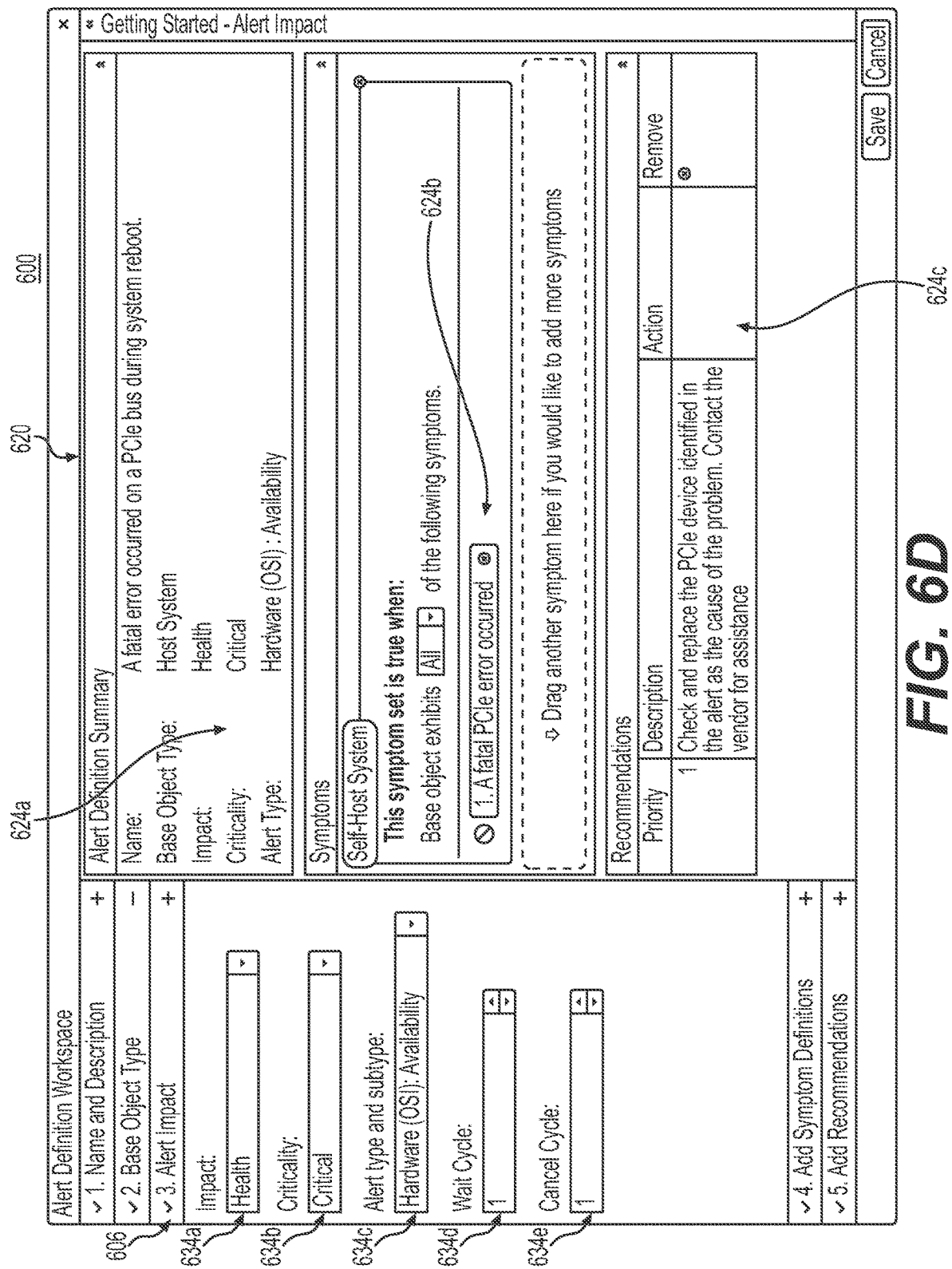

With reference to FIG. 6D, the step 606 (entitled "3. Alert Impact") has been selected. Step 606 includes selectable drop-down menus 634a-e. The selections made in drop-down menus 634a-e impact the contents of visualization 624a. Drop-down menus 634a-e allow a user to define the impact, criticality, alert type and subtype, wait cycle, and cancel cycle for the alert definition, of which the impact, criticality, and alert type are displayed within visualization 624a.

Figure 6E:
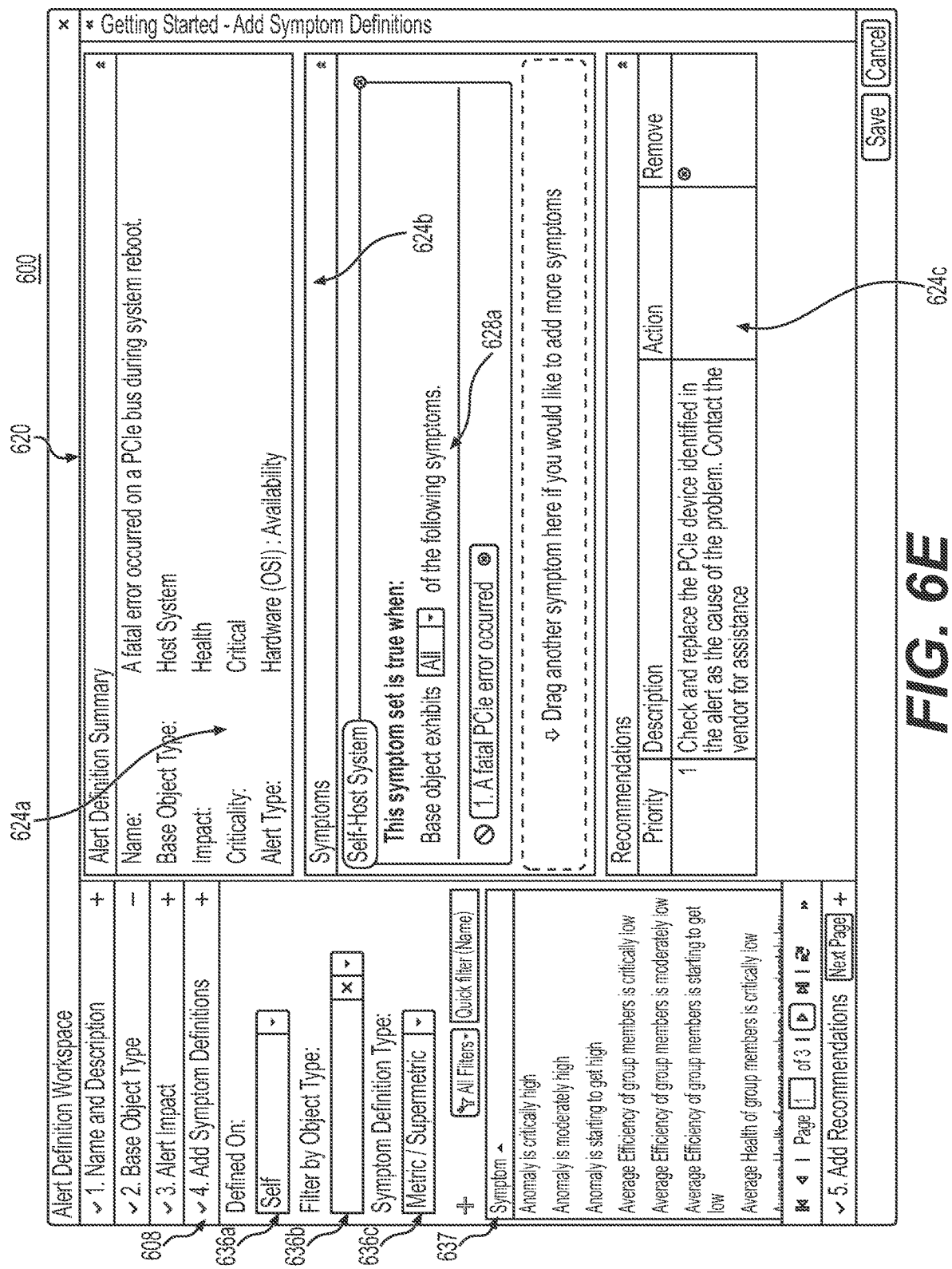

With reference to FIG. 6E, the step 608 (entitled "4. Add Definition Symptoms") has been selected. Step 608 includes selectable drop-down menus 636a-c and symptom list 637. The selections made in drop-down menus 634a-c and symptom list 637 are used for creating a symptom for placement in visualization 624b. As shown in FIG. 6E, visualization 624b includes symptom 628a.

Figure 6F:
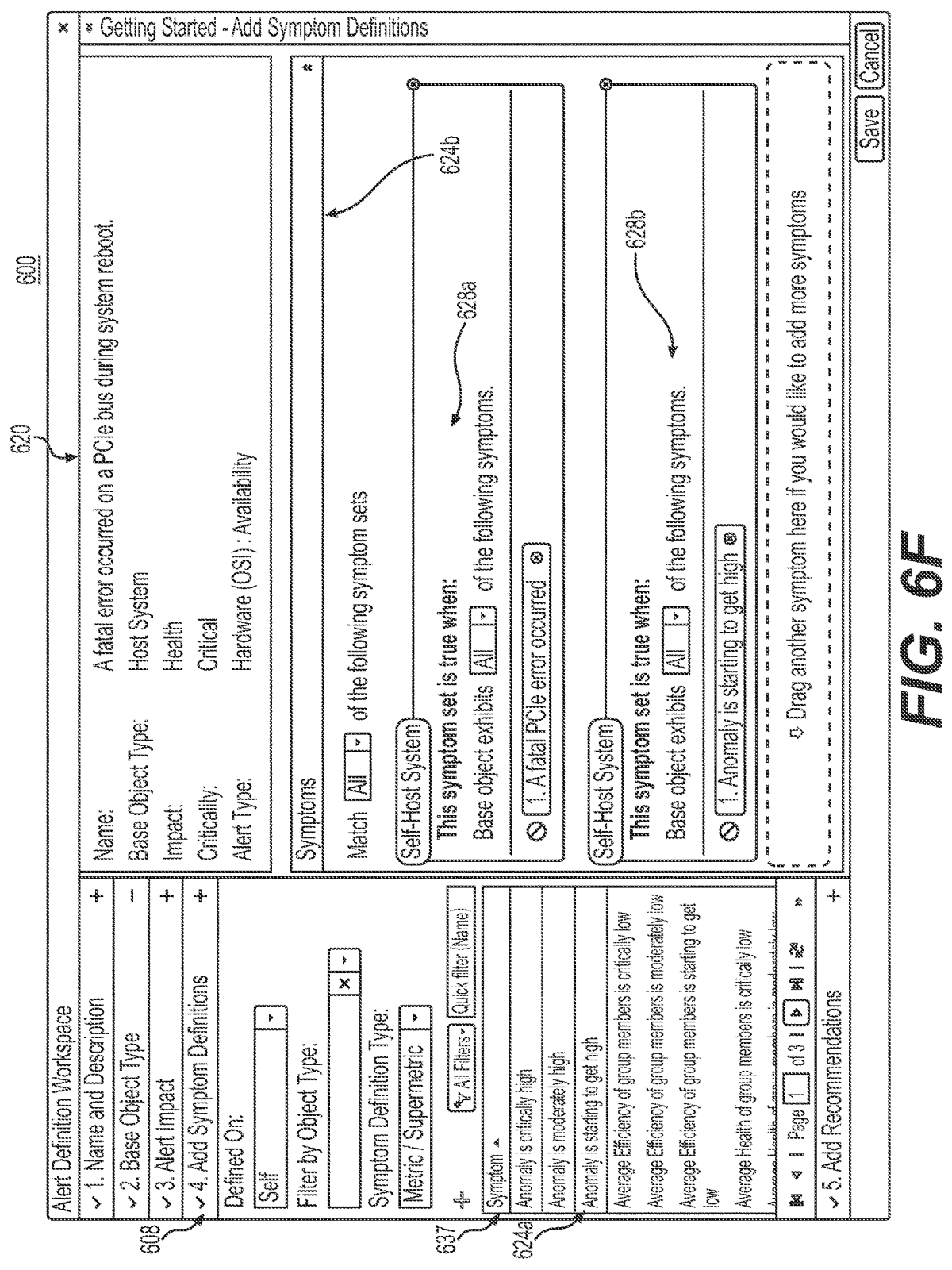

With reference to FIG. 6F, symptom 628b is created in visualization 624b in response to a user interaction with symptom 642a of symptom list 637 ("1. Anomaly is starting to get high"). It should be appreciated that any number of symptoms can be added to the alert definition, and that added symptoms are presented in visualization 624b.

Figure 6G:
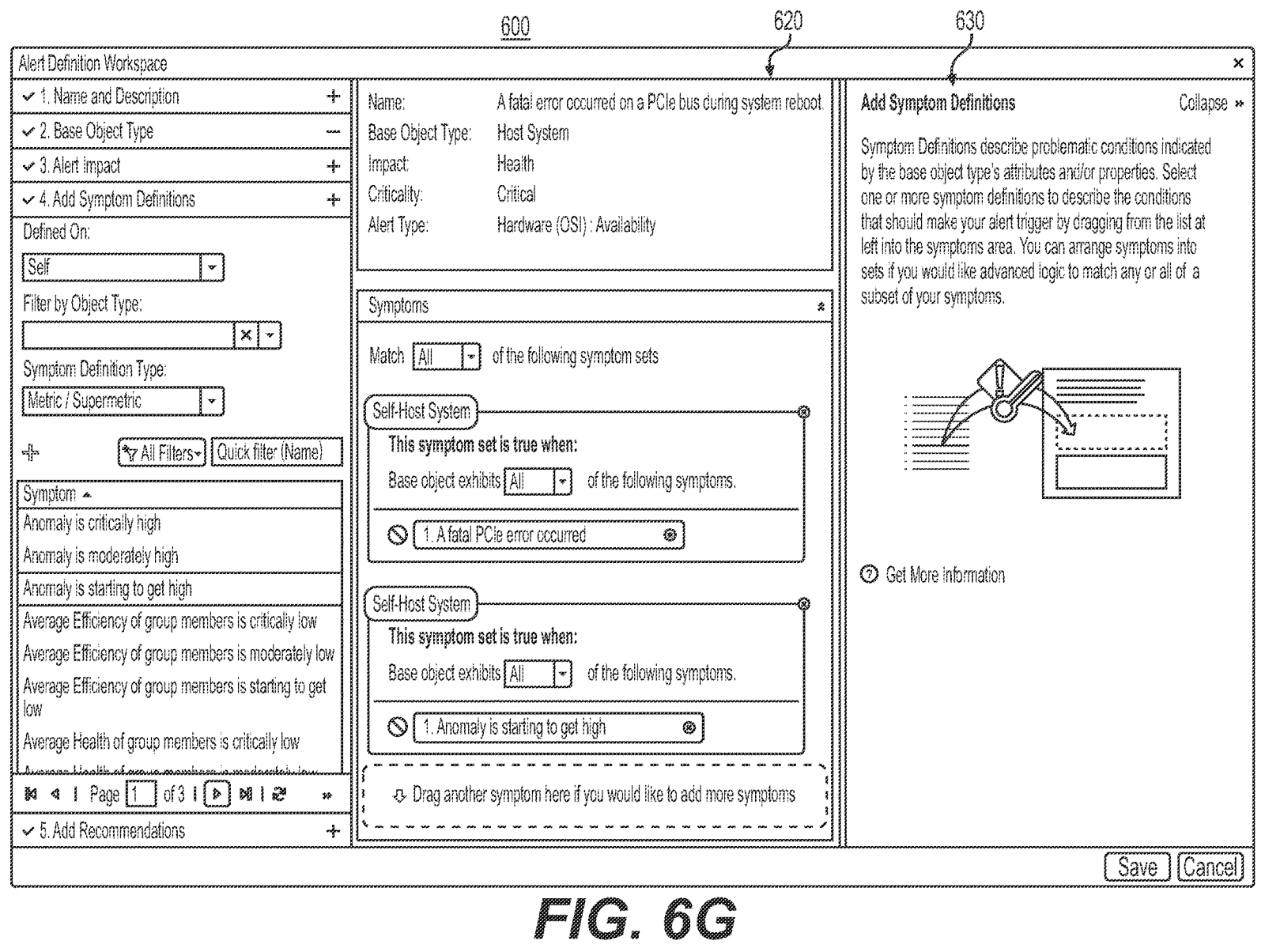

As shown in FIG. 6G, instructional region 630 presents guidance to a user related to operation of workspace modeler 600. Instructional region 630 provides a description of how to add symptom definitions.

Figure 6H:
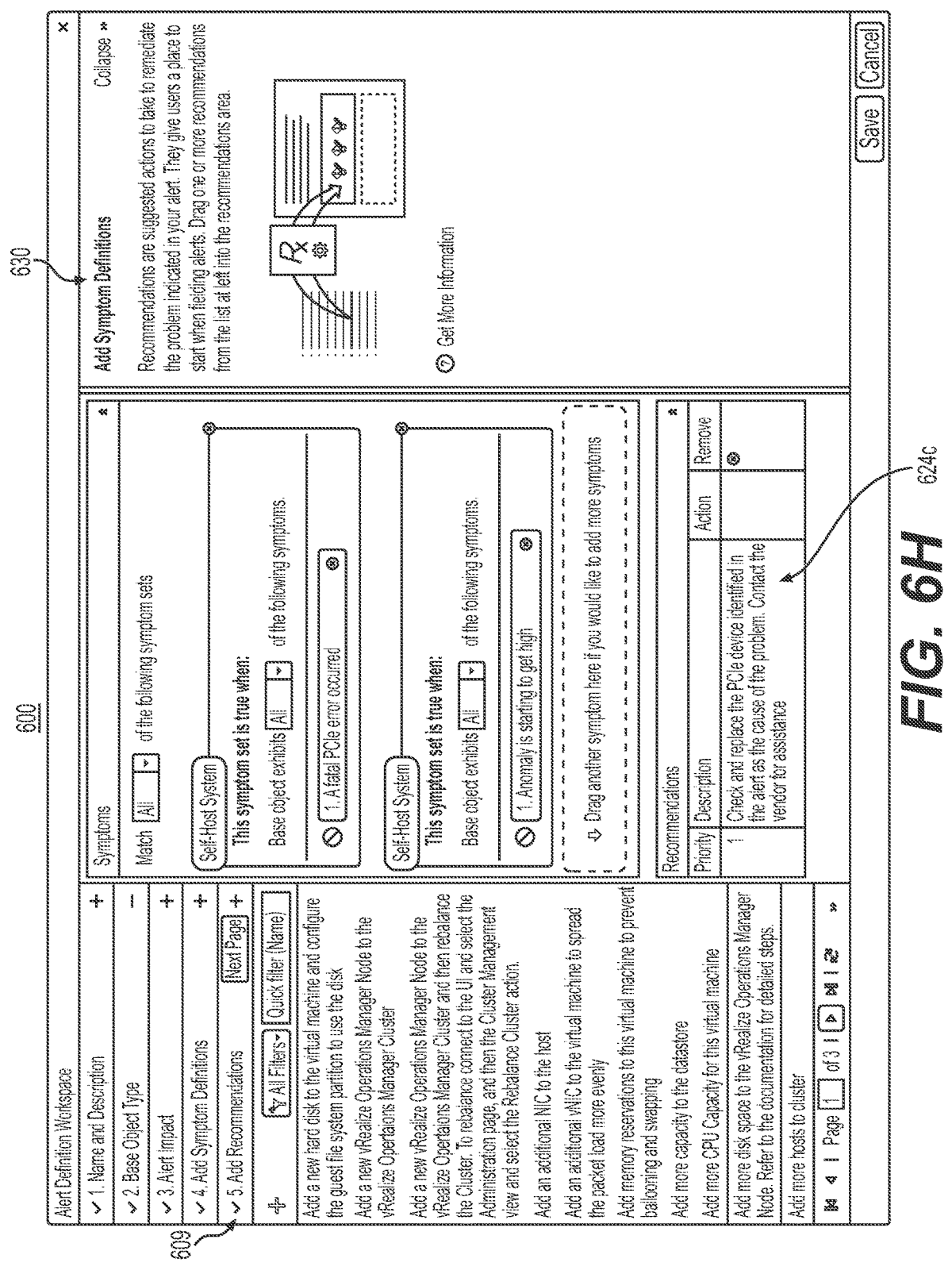

With reference to FIG. 6H, a user has selected step 609, allowing a user to select recommendations to add to the alert definition. Selected recommendations are added to visualization 624c. Moreover, instructional region 630 has been changed to provide a description of how to add recommendations.

Example Methods of Operation

The following discussion sets forth in detail the operation of some example methods of operation of embodiments. With reference to FIGS. 7A and 7B, flow diagram 700 illustrates example procedures used by various embodiments. Flow diagram 700 includes some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within computer system 100. The computer-readable and computer-executable instructions, which reside on tangible computer readable storage media, are used to control or operate in conjunction with, for example, one or some combination of processors of computer system 100. It is appreciated that the processor(s) may be physical or virtual or some combination (it should also be appreciated that a virtual processor is implemented on physical hardware). Although specific procedures are disclosed in flow diagram 700, such procedures are examples. That is, embodiments are well suited to performing various other procedures or variations of the procedures recited in flow diagram 700, alone or in combination. Likewise, in some embodiments, the procedures in flow diagram 700, alone or in combination, may be performed in an order different than presented and/or not all of the procedures described in one or more of these flow diagrams may be performed. It is further appreciated that procedures described in flow diagram 700, alone or in combination, may be implemented in hardware, or a combination of hardware with firmware and/or software.

FIGS. 7A and 7B are flow diagram 700 of example operations of a method of workspace modeling, according to various embodiments. Although specific procedures are disclosed in flow diagram 700, embodiments are well suited to performing various other procedures or variations of the procedures recited in flow diagram 700. It is appreciated that the procedures in flow diagram 700 may be performed in an order different than presented, that not all of the procedures in flow diagram 700 may be performed, and that additional procedures to those illustrated and described may be performed. It is further appreciated that procedures described in flow diagram 700 may be implemented in hardware, or a combination of hardware with firmware and/or software.

With reference to FIG. 7A, in one embodiment, as shown at procedure 710, an instructional region is provided within the workspace modeler. The instructional region is for presenting guidance to a user related to operation of the workspace modeler.

At procedure 720 of flow diagram 700, a user selection of a step is received at a workflow region of a workspace modeler. The workflow region includes a plurality of steps, wherein at least one step of the plurality of steps is unavailable for user selection prior to satisfaction of a prerequisite condition associated with another step of the plurality of steps. Available steps of the plurality of steps are selectable in any order by a user. In one embodiment, as shown at procedure 722, a contextual instructional message related to an area of interaction is provided, in response to a user interaction within the workflow region.

In one embodiment, the plurality of steps are presented in a suggested order. In one embodiment, the order of the steps selected by the user is non-linear with respect to an order in which the plurality of steps is presented. In another embodiment, the order of the steps selected by the user is linear.

At procedure 730, access to a plurality of objects associated with the step is provided in response to the user selection of the step. The plurality of objects are selectable by the user for inclusion in a content region of the workspace modeler. In one embodiment, as shown at procedure 732, an accordion view of the step is toggled to allow access to the plurality of objects.

At procedure 740, a user selection of an object at the workflow region is received. In one embodiment, as shown at procedure 742, a drag and drop operation of the object from the workflow region to the content region is received.

With reference now to FIG. 7B, at procedure 750 of flow diagram 700, a visualization of the object to the content region in response to the user selection of the object. The visualization of the object remains persistent within the content region regardless of a user selection of a different step of the available steps.

In one embodiment, as shown at procedure 760, an indication that the step is completed is provided in response to a user completing minimum requirements for the step.

In one embodiment, as shown at procedure 770, another step is indicated as available for user selection in response Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A method for configuring a virtualization infrastructure report, the method including:
   displaying, at a display screen, a report content region, a report workflow region including a plurality of steps for constructing report content using real-time data received from at least one component of a virtualization infrastructure, the plurality of steps being selectable by a user in any order, and an instructional region for providing guidance to a user related to operations on the report and available export formats;
   presenting visual indicators on each of the plurality of steps to indicate that a step is available, unavailable, or completed, wherein at least one step of the plurality of steps is unavailable for selection prior to satisfaction of a prerequisite condition associated with another step of the plurality of steps, wherein the prerequisite condition includes at least a report name;
   in response to selection of a first step, displaying a first set of objects associated with the first step in the report workflow region;
   in response to selection of a first object from the first set of objects using a drag and drop operation:
   including the selected object into the report content region and displaying a visualization of the first object in the report content region that presents real-time data received from the at least one component of the virtualization infrastructure; and
   displaying a contextual instructional message in the report content region providing instructional information related to an operations of the selected first step;
   in response to selection of a second step, presenting a plurality of available formats for the report being created; and
   in response to selection of one of the plurality of available formats, presenting a visual indicator on the second step that the second step is completed,
   wherein the visualization of the first object persists within the report content region upon selection of the second step from the report workflow region.

2. The method of claim 1, further including:
   in response to selection of a third step from the report workflow region, displaying a second set of objects associated with the third step; and
   in response to selection of a second object from the second set of objects, displaying a visualization of the second object in the report content region,
   wherein the visualization of the first object persists within the report content region upon selection of the second object such that the visualization of the first object is displayed together with the visualization of the second object in the report content region.

3. The method of claim 1, wherein the at least one component of the virtualization infrastructure is a virtualization management server.

4. The method of claim 1, further including:
   in response to satisfaction of the prerequisite condition associated with the another step of the plurality of steps, indicating that the one step is now available for user selection.

5. The method of claim 1, wherein the plurality of steps are presented in a suggested order.

6. The method of claim 5, wherein the order in which the plurality of steps are selected by the user is non-linear.

7. A non-transitory, computer-readable medium including instructions that, when executed by a processor, performs stages for configuring a virtualization infrastructure report, the stages including:
   displaying, at a display screen, a report content region, a report workflow region including a plurality of steps for constructing report content using real-time data received from at least one component of a virtualization infrastructure, the plurality of steps being selectable by a user in any order, and an instructional region for providing guidance to a user related to operations on the report and available export formats;
   presenting visual indicators on each of the plurality of steps to indicate that a step is available, unavailable, or completed, wherein at least one step of the plurality of steps is unavailable for selection prior to satisfaction of a prerequisite condition associated with another step of the plurality of steps, wherein the prerequisite condition includes at least a report name;
   in response to selection of a first step, displaying a first set of objects associated with the first step in the report workflow region;
   in response to selection of a first object from the first set of objects using a drag and drop operation:
   including the selected object into the report content region and displaying a visualization of the first object in the report content region that presents real-time data received from the at least one component of the virtualization infrastructure; and
   displaying a contextual instructional message in the report content region providing instructional information related to an operations of the selected first step;
   in response to selection of a second step, presenting a plurality of available formats for the report being created; and
   in response to selection of one of the plurality of available formats, presenting a visual indicator on the second step that the second step is completed,
   wherein the visualization of the first object persists within the report content region upon selection of the second step from the report workflow region.

8. The non-transitory, computer-readable medium of claim 7, the stages further including:
   in response to selection of a third step from the report workflow region, displaying a second set of objects associated with the third step; and
   in response to selection of a second object from the second set of objects, displaying a visualization of the second object in the report content region,
   wherein the visualization of the first object persists within the report content region upon selection of the second object such that the visualization of the first object is displayed together with the visualization of the second object in the report content region.

9. The method of claim 7, wherein the at least one component of the virtualization infrastructure is a virtualization management server.

10. The non-transitory, computer-readable medium of claim 7, the stages further including:
   in response to satisfaction of the prerequisite condition associated with the another step of the plurality of steps, indicating that the one step is now available for user selection.

11. The non-transitory, computer-readable medium of claim 7, wherein the plurality of steps are presented in a suggested order.

12. The non-transitory, computer-readable medium of claim 11, wherein the order in which the plurality of steps are selected by the user is non-linear.

13. A system for configuring a virtualization infrastructure report, the system including:
   a memory storage including a non-transitory, computer-readable medium including instructions; and
   a computing device including a processor that executes the instructions to carry out stages including:
   displaying, at a display screen, a report content region, a report workflow region including a plurality of steps for constructing report content using real-time data received from at least one component of a virtualization infrastructure, the plurality of steps being selectable by a user in any order, and an instructional region for providing guidance to a user related to operations on the report and available export formats;
   presenting visual indicators on each of the plurality of steps to indicate that a step is available, unavailable, or completed, wherein at least one step of the plurality of steps is unavailable for selection prior to satisfaction of a prerequisite condition associated with another step of the plurality of steps, wherein the prerequisite condition includes at least a report name;
   in response to selection of a first step, displaying a first set of objects associated with the first step in the report workflow region; and
   in response to selection of a first object from the first set of objects using a drag and drop operation:
   including the selected object into the report content region and displaying a visualization of the first object in the report content region that presents real-time data received from the at least one component of the virtualization infrastructure; and
   displaying a contextual instructional message in the report content region providing instructional information related to an operations of the selected first step;
   in response to selection of a second step, presenting a plurality of available formats for the report being created; and
   in response to selection of one of the plurality of available formats, presenting a visual indicator on the second step that the second step is completed,
   wherein the visualization of the first object persists within the report content region upon selection of the second step from the report workflow region.

14. The system of claim 13, further including:
   in response to selection of a third step from the report workflow region, displaying a second set of objects associated with the third step; and
   in response to selection of a second object from the second set of objects, displaying a visualization of the second object in the report content region,
   wherein the visualization of the first object persists within the report content region upon selection of the second object such that the visualization of the first object is displayed together with the visualization of the second object in the report content region.

15. The method of claim 13, wherein the at least one component of the virtualization infrastructure is a virtualization management server.

16. The system of claim 13, further including:
   in response to satisfaction of the prerequisite condition associated with the another step of the plurality of steps, indicating that the one step is now available for user selection.

17. The system of claim 13, wherein the plurality of steps are presented in a suggested order.

* * * * *